United States Patent
McKee

(10) Patent No.: US 11,124,299 B2
(45) Date of Patent: Sep. 21, 2021

(54) MULTI-MODE TRANSFORMABLE MONUMENTS FOR AIRCRAFT DOORWAY SPACES

(71) Applicant: Rockwell Collins, Inc., Cedar Rapids, IA (US)

(72) Inventor: Jefferey M. McKee, Duvall, WA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 439 days.

(21) Appl. No.: 16/030,586

(22) Filed: Jul. 9, 2018

(65) Prior Publication Data
US 2019/0308728 A1 Oct. 10, 2019

Related U.S. Application Data

(63) Continuation-in-part of application No. 15/950,089, filed on Apr. 10, 2018, now abandoned.

(51) Int. Cl.
*B64D 11/00* (2006.01)
*B64D 11/04* (2006.01)
*B64D 11/06* (2006.01)

(52) U.S. Cl.
CPC .............. *B64D 11/04* (2013.01); *B64D 11/00* (2013.01); *B64D 11/003* (2013.01);
(Continued)

(58) Field of Classification Search
CPC ............ B64D 11/0007; B64D 11/0691; B64D 47/02; B64D 11/00; B64D 2011/0038;
(Continued)

(56) References Cited

U.S. PATENT DOCUMENTS 2,763,900 A * 9/1956 McAfee ................ B64C 1/1407
  49/70
2,854,307 A * 9/1958 Londeree ................ A47B 77/04
  312/247

(Continued)

FOREIGN PATENT DOCUMENTS

CN  103622319 A   3/2014
DE  102005043610 A1  3/2007
(Continued)

OTHER PUBLICATIONS

Extended European Search Report dated Aug. 26, 2019 for European Appln. No. 19167878.8.
(Continued)

*Primary Examiner* — Medhat Badawi
(74) *Attorney, Agent, or Firm* — Suiter Swantz pc llo

(57) ABSTRACT

Transformable monuments may be positioned proximate to aircraft exit doors to utilize the doorway spaces as temporary workspaces for cabin crew or destination spaces for passengers once cruising altitude is achieved. A transformable monument includes transforming portions that extend or pivot into an aircraft cross-aisle upon actuation of an exterior latch by either hand. The transforming portions extend or pivot into horizontal surfaces for crew or passenger use while protecting the exit doors from unauthorized access by passengers inflight. Transforming portions of a single monument may extend partially or fully across the cross-aisle, or a system of two transformable monuments on either side of the exit door may collectively define the temporary space. The upper and middle sections of the monument may include additional storage or self-service compartments for providing refreshments or other amenities to passengers.

8 Claims, 29 Drawing Sheets

(52) U.S. Cl.
CPC ...... *B64D 11/0007* (2013.01); *B64D 11/0015* (2013.01); *B64D 11/0624* (2014.12); *B64D 11/0639* (2014.12); *B64D 11/0691* (2014.12); *B64D 2011/0038* (2013.01)

(58) Field of Classification Search
CPC ............ B64D 11/0015; B64D 11/0023; B64D 11/003; B64D 11/04; B64D 11/0624; B64D 11/0639; B64D 2011/0046; A47B 31/04; A47B 31/06
See application file for complete search history.

(56) References Cited

U.S. PATENT DOCUMENTS

| | | | | |
|---|---|---|---|---|
| 3,472,219 A | * | 10/1969 | Roy | A47B 77/022 126/37 R |
| 4,022,404 A | * | 5/1977 | Greiss | B64D 11/0007 244/118.5 |
| 4,055,317 A | * | 10/1977 | Greiss | B64D 11/00 244/118.5 |
| 4,361,014 A | * | 11/1982 | Blain | A47J 39/006 62/237 |
| 4,375,876 A | * | 3/1983 | Stewart | B64C 1/1438 160/201 |
| 4,478,467 A | | 10/1984 | Tyndall | |
| RE32,176 E | * | 6/1986 | Vernon | A47B 77/02 186/40 |
| 4,776,903 A | * | 10/1988 | Nordskog | B32B 27/065 156/64 |
| 5,090,639 A | * | 2/1992 | Miller | B64D 9/00 244/118.1 |
| 5,224,297 A | * | 7/1993 | Watkins | E05B 17/04 292/210 |
| 5,322,244 A | * | 6/1994 | Dallmann | B64D 11/04 244/118.5 |
| 5,907,127 A | * | 5/1999 | Daoud | H02G 3/14 174/57 |
| 6,007,025 A | * | 12/1999 | Coughren | B64D 11/02 105/329.1 |
| 6,257,523 B1 | * | 7/2001 | Olliges | B61D 17/048 160/210 |
| D455,391 S | * | 4/2002 | Granzeier | D12/345 |
| 6,470,512 B1 | * | 10/2002 | Lau | A47K 3/30 4/612 |
| 6,646,863 B1 | | 11/2003 | White et al. | |
| 6,691,952 B2 | * | 2/2004 | Keogh | A61G 3/00 244/118.5 |
| 6,761,332 B1 | * | 7/2004 | Bengtsson | B64D 11/04 244/117 R |
| 6,928,236 B2 | * | 8/2005 | Suzuki | B64D 11/04 392/441 |
| 7,584,926 B2 | * | 9/2009 | Harrington | B64D 11/0007 212/312 |
| D604,254 S | * | 11/2009 | Lanfear | D13/162 |
| D610,554 S | * | 2/2010 | Lanfear | D13/162 |
| D611,005 S | * | 3/2010 | Lanfear | D13/162 |
| D611,006 S | * | 3/2010 | Lanfear | D13/162 |
| D615,045 S | * | 5/2010 | Lanfear | D13/162 |
| D631,446 S | * | 1/2011 | Lanfear | D13/162 |
| 7,954,761 B2 | * | 6/2011 | Johnson | A47B 31/02 244/118.5 |
| 8,519,824 B1 | * | 8/2013 | Rankin | B64D 11/04 340/10.1 |
| 8,820,862 B1 | * | 9/2014 | Erickson | B64D 11/00 312/257.1 |
| D730,804 S | * | 6/2015 | Cuddy | D12/345 |
| 2001/0050519 A1 | * | 12/2001 | Kasuya | B64D 11/04 312/315 |
| 2005/0070152 A1 | * | 3/2005 | Suzuki | H01R 13/641 439/501 |
| 2005/0116098 A1 | * | 6/2005 | Martens | B64D 45/0015 244/118.5 |
| 2005/0121978 A1 | * | 6/2005 | McAvoy | H02J 3/14 307/43 |
| 2005/0133308 A1 | * | 6/2005 | Reysa | B64D 11/04 186/40 |
| 2005/0156560 A1 | * | 7/2005 | Shimaoka | H02J 50/80 320/107 |
| 2005/0224646 A1 | * | 10/2005 | Mills | B64D 11/04 244/118.5 |
| 2005/0230540 A1 | * | 10/2005 | Harrington | B64D 11/0007 244/118.2 |
| 2006/0060181 A1 | * | 3/2006 | Sasaki | F24C 15/322 126/21 A |
| 2006/0145002 A1 | * | 7/2006 | Van Loon | B64D 11/04 244/118.1 |
| 2006/0237182 A1 | * | 10/2006 | Godecker | A47J 39/02 165/253 |
| 2007/0035919 A1 | | 2/2007 | Doebertin et al. | |
| 2007/0102579 A1 | * | 5/2007 | Krieglsteiner | B64D 11/00 244/129.1 |
| 2007/0228216 A1 | * | 10/2007 | Wenstrom | B64D 11/04 244/118.5 |
| 2008/0001031 A1 | * | 1/2008 | Doebertin | B64D 11/04 244/118.1 |
| 2008/0150406 A1 | * | 6/2008 | Arnold | B64D 11/04 312/237 |
| 2009/0112377 A1 | * | 4/2009 | Schalla | B64D 11/0015 701/3 |
| 2009/0206200 A1 | * | 8/2009 | Bolder | B64D 25/16 244/118.5 |
| 2009/0278429 A1 | * | 11/2009 | Erickson | B64D 11/04 312/265.1 |
| 2009/0314889 A1 | * | 12/2009 | Baatz | B64D 11/04 244/118.5 |
| 2009/0321574 A1 | * | 12/2009 | Erickson | E05C 1/02 244/131 |
| 2010/0001126 A1 | * | 1/2010 | Supan | B60N 2/01558 244/1 A |
| 2010/0050665 A1 | * | 3/2010 | Oswald | F25D 11/003 62/89 |
| 2010/0071384 A1 | * | 3/2010 | Lu | F25B 7/00 62/3.2 |
| 2010/0116933 A1 | * | 5/2010 | Erickson | B64D 11/0696 244/118.5 |
| 2010/0140398 A1 | * | 6/2010 | Cunningham | A47J 39/006 244/118.5 |
| 2010/0155391 A1 | * | 6/2010 | Koschberg | B64D 11/04 219/672 |
| 2010/0219292 A1 | * | 9/2010 | Saint-Jaimes | B64D 11/0691 244/118.5 |
| 2010/0243800 A1 | * | 9/2010 | Koschberg | B64D 11/04 244/118.5 |
| 2011/0090064 A1 | * | 4/2011 | Dahms | G06Q 10/00 340/10.42 |
| 2011/0101160 A1 | * | 5/2011 | Gomes | B64C 1/1423 244/118.5 |
| 2011/0148664 A1 | * | 6/2011 | Shiomori | B64D 11/00155 340/945 |
| 2011/0210203 A1 | * | 9/2011 | Chua | B61D 37/006 244/118.5 |
| 2011/0210204 A1 | * | 9/2011 | Collins | B64D 11/0643 244/118.6 |
| 2011/0215199 A1 | * | 9/2011 | Lee | B63B 29/22 244/118.5 |
| 2011/0238742 A1 | * | 9/2011 | Birkmann | H04L 43/10 709/203 |
| 2011/0309746 A1 | * | 12/2011 | Eckel | H05B 45/20 315/77 |
| 2012/0047911 A1 | * | 3/2012 | Bhavsar | F25D 11/00 62/3.6 |
| 2012/0160111 A1 | * | 6/2012 | Hozumi | B64D 11/04 99/474 |
| 2012/0217343 A1 | * | 8/2012 | Koschberg | B64D 11/04 244/118.5 |
| 2012/0248245 A1 | * | 10/2012 | Schliwa | B61D 37/006 244/118.5 |

(56) References Cited

U.S. PATENT DOCUMENTS

| | | | | |
|---|---|---|---|---|
| 2012/0261509 A1* | 10/2012 | Grant | ..................... | B64D 11/02 244/118.5 |
| 2012/0273614 A1* | 11/2012 | Ehlers | .................... | B64D 11/04 244/118.5 |
| 2013/0187000 A1* | 7/2013 | Godecker | .......... | B64D 11/0007 244/118.5 |
| 2013/0206904 A1* | 8/2013 | Gee | ........................ | B64D 11/04 244/118.5 |
| 2013/0206906 A1* | 8/2013 | Burrows | ............ | B64D 11/0691 244/118.5 |
| 2013/0247590 A1* | 9/2013 | Lu | ........................ | B64D 11/0604 62/3.6 |
| 2013/0248649 A1* | 9/2013 | Burd | ......................... | B32B 5/18 244/1 N |
| 2013/0248652 A1* | 9/2013 | Godecker | .............. | G06F 3/1431 244/118.5 |
| 2013/0257067 A1* | 10/2013 | Burd | ......................... | E05C 3/04 292/200 |
| 2013/0259562 A1* | 10/2013 | Burd | ...................... | B64D 11/02 403/187 |
| 2013/0270983 A1* | 10/2013 | Godecker | .............. | F25D 23/021 312/236 |
| 2014/0008492 A1* | 1/2014 | Ehlers | .................... | B64D 11/02 244/118.5 |
| 2014/0048650 A1* | 2/2014 | Schliwa | .................. | B64D 11/06 244/118.5 |
| 2014/0054416 A1* | 2/2014 | Lee | ...................... | B64D 11/003 244/118.1 |
| 2014/0209741 A1* | 7/2014 | Boenning | .............. | B64D 11/04 244/118.6 |
| 2014/0238064 A1* | 8/2014 | Hawkins | ................. | F25D 23/02 62/244 |
| 2014/0263835 A1* | 9/2014 | Godecker | .......... | B64D 11/0007 244/118.5 |
| 2014/0291446 A1* | 10/2014 | Reams | ................... | B64D 11/02 244/118.5 |
| 2014/0319275 A1* | 10/2014 | Najd | ...................... | B64D 11/02 244/118.6 |
| 2014/0339363 A1* | 11/2014 | Moje | ...................... | B64D 11/02 244/118.5 |
| 2014/0352929 A1* | 12/2014 | Wu | ....................... | F25D 23/067 165/104.34 |
| 2014/0353425 A1* | 12/2014 | Boren, Jr. | .............. | B64D 11/04 244/118.5 |
| 2014/0355282 A1* | 12/2014 | Cuddy | ................... | B64D 47/02 362/471 |
| 2014/0359934 A1* | 12/2014 | Schliwa | ................. | B64D 11/02 4/664 |
| 2014/0367516 A1* | 12/2014 | Lange | .................... | B65D 88/14 244/118.1 |
| 2014/0367517 A1* | 12/2014 | Eckel | .................... | B64D 47/02 244/118.5 |
| 2015/0028670 A1* | 1/2015 | Boodaghians | ......... | B64D 11/04 307/9.1 |
| 2016/0167784 A1* | 6/2016 | Schliwa | ................. | B64D 11/04 244/118.6 |
| 2017/0101187 A1* | 4/2017 | Noske | ..................... | H02J 5/005 |
| 2017/0179756 A1* | 6/2017 | Augustat | ............... | H02J 7/1461 |
| 2017/0309136 A1* | 10/2017 | Schoner | ............... | G07G 1/0045 |

FOREIGN PATENT DOCUMENTS

| | | |
|---|---|---|
| DE | 202015106958 U1 | 1/2016 |
| EP | 1125520 A1 | 8/2001 |
| EP | 2724938 A1 | 4/2014 |
| EP | 2808255 A2 | 12/2014 |
| EP | 3156331 B1 | 8/2018 |
| GB | 1599821 A | 10/1981 |
| WO | 2011160111 A1 | 12/2011 |
| WO | 2015014850 A1 | 2/2015 |

OTHER PUBLICATIONS

Extended Search Report for European Application No. 20175242.5 dated Oct. 20, 2020, 7 pages.
Examination Report for European Application No. 19167878.8 dated Oct. 13, 2020, 6 pages.
Examination Report for European Application No. 19167878.8 dated Apr. 28, 2021, 9 pages.

* cited by examiner

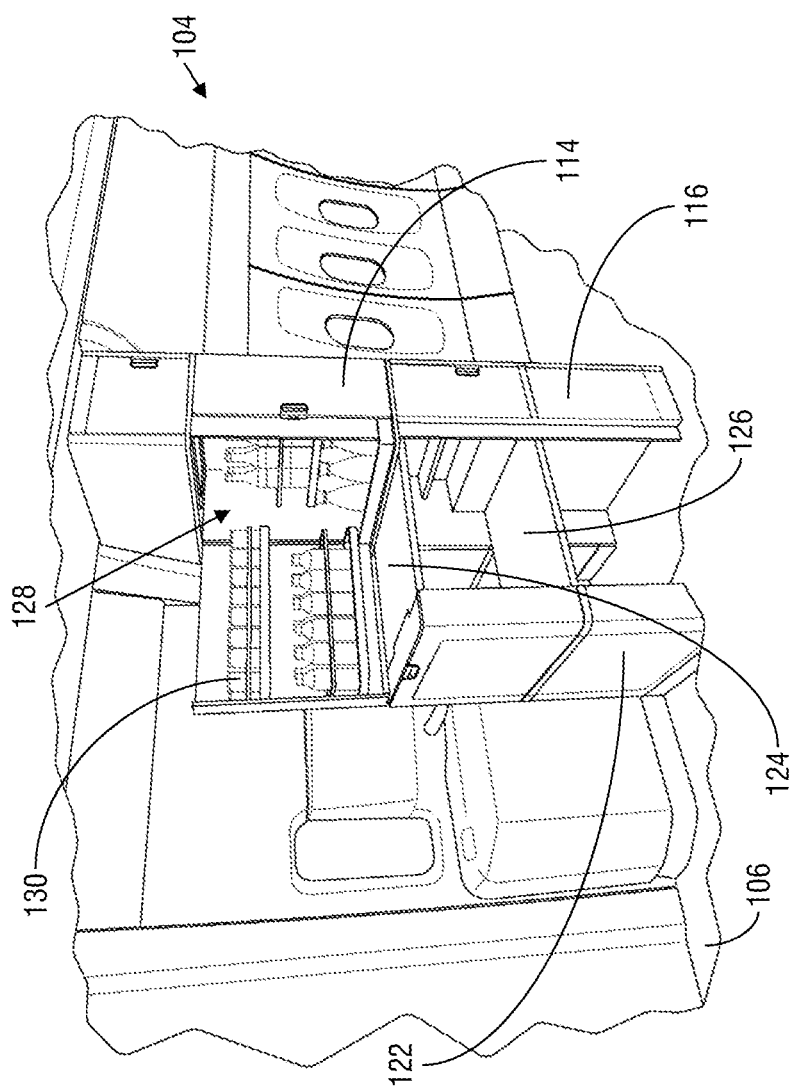

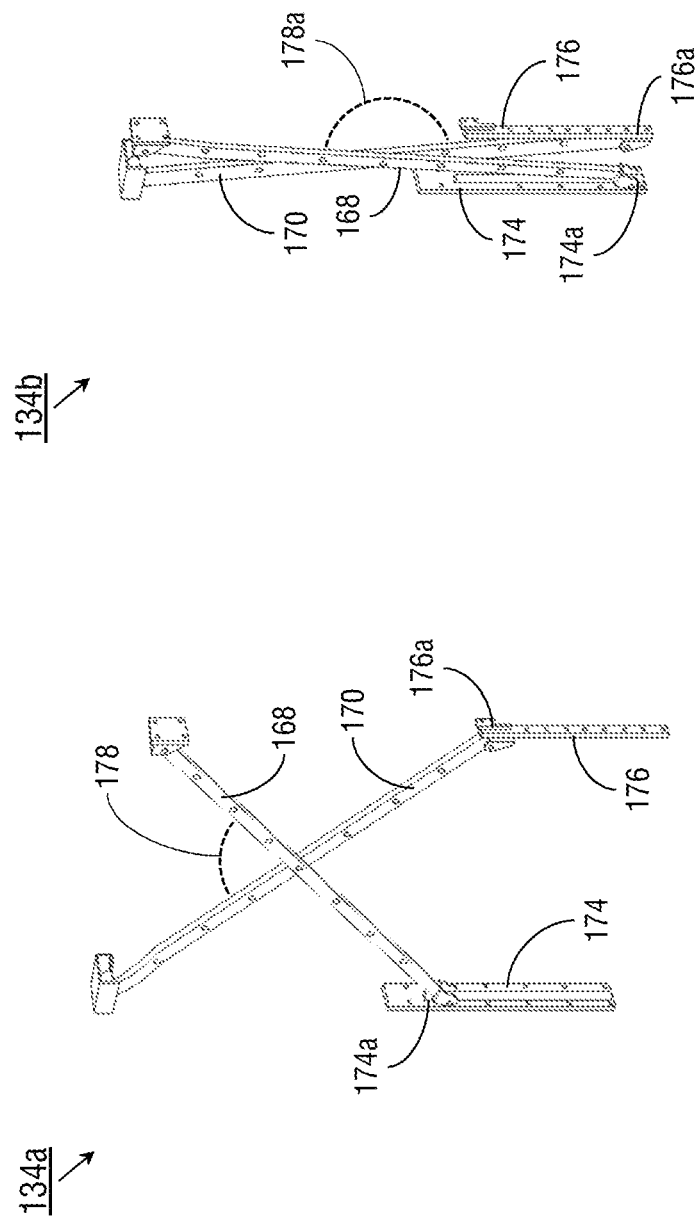

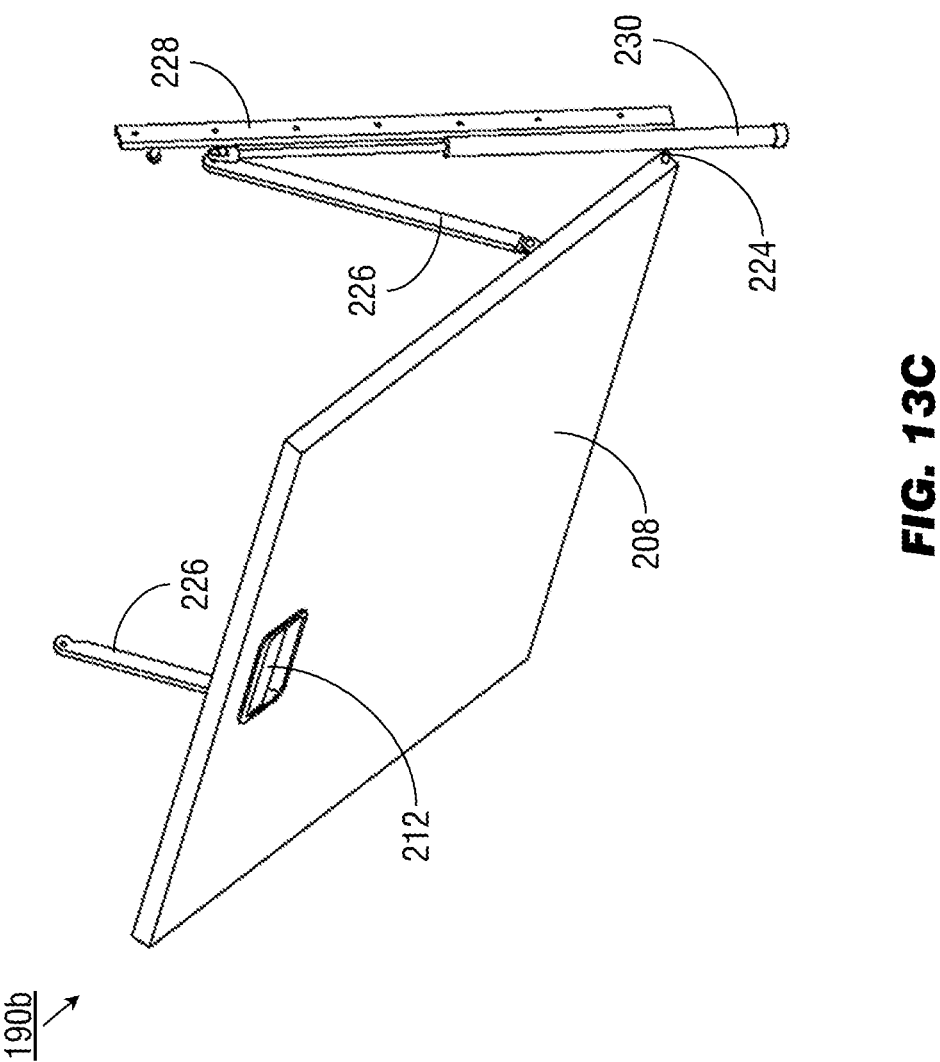

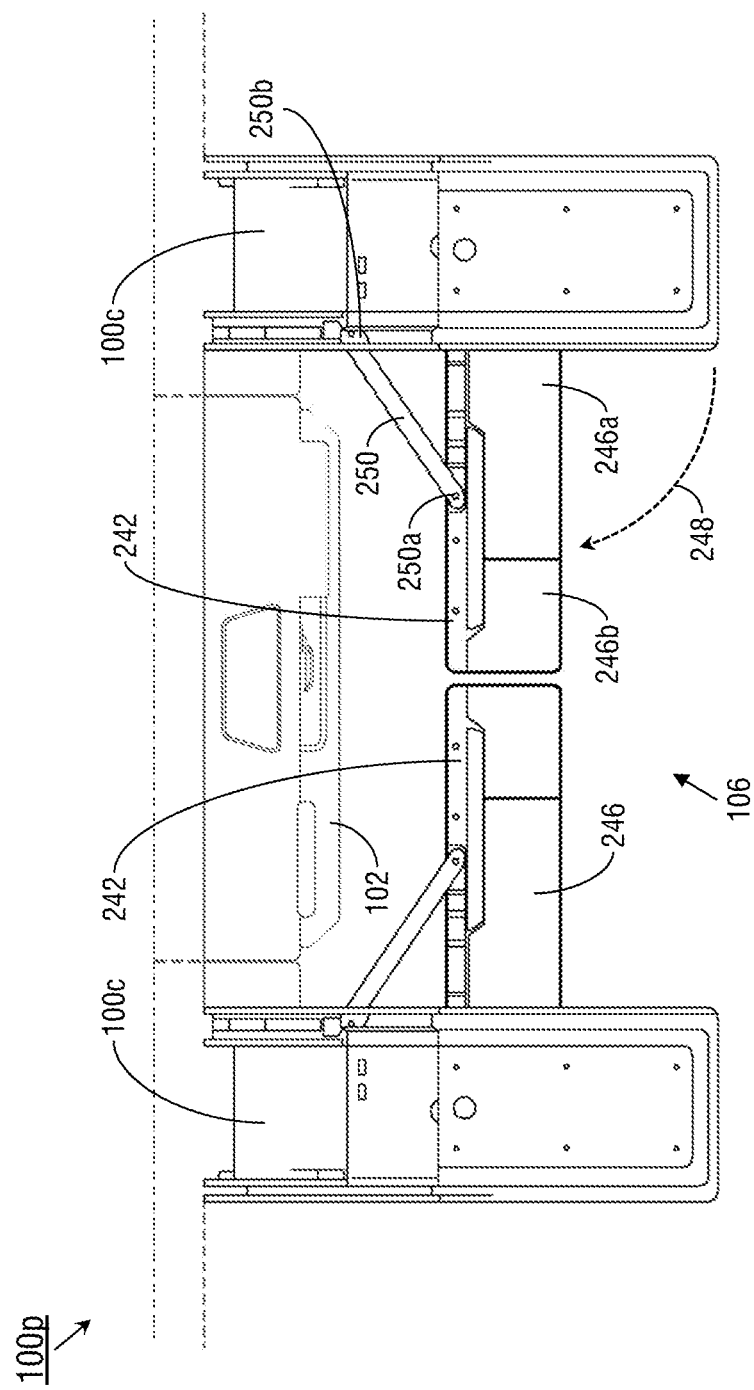

MULTI-MODE TRANSFORMABLE MONUMENTS FOR AIRCRAFT DOORWAY SPACES

CROSS-REFERENCE TO RELATED APPLICATIONS

The present application claims priority under 35 U.S.C. § 120 as a continuation-in-part of co-pending U.S. patent application Ser. No. 15/950,089, filed Apr. 10, 2018, entitled MULTI-MODE TRANSFORMABLE MONUMENTS FOR AIRCRAFT DOORWAY SPACES. Said U.S. patent application Ser. No. 15/950,089 is herein incorporated by reference in its entirety.

BACKGROUND

Conventional aircraft monuments are purpose-built and generally inflexible products. The catering capacities and work/storage spaces of such monuments are not adaptable to multiple and diverse needs of cabin crew with respect to passenger catering. However, free space (e.g., space not already dedicated to passenger seating or storage) is extremely limited, especially in economy-class cabins, leaving few options to provide cabin crew with additional workspace. Similarly, from a passenger perspective, luxury-class aircraft provide entertainment and socialization spaces for their passengers. However, these amenities are rare in economy-class cabins for substantially the same reasons. Both single-aisle and larger twin-aisle aircraft may necessarily require free space immediately adjacent to their exit doors in order to facilitate safe, rapid evacuation of the aircraft under emergency conditions. However, under normal cruising conditions these spaces are left underutilized or unutilized.

SUMMARY

In one aspect, embodiments of the inventive concepts disclosed herein are directed to a transformable monument or system thereof. The transformable monument is positionable adjacent to an aircraft cross-aisle (e.g., an aisle extending laterally across the aircraft between two exit doors on opposite sides of the aircraft). Portions of the transformable monument may extend, pivot, or unfold into the cross-aisle, simultaneously creating a temporary workspace for cabin crew or a destination space for passengers while protecting the exit door from unauthorized inflight access by passengers. For example, the transformable monument may extend from the floor to the ceiling of the aircraft, set into a bulkhead or inner wall and extending inboard to the longitudinal aisle. The transformable monument is generally divided into upper, middle, and lower portions, each portion including compartments for storage of amenities and necessities and accessible, e.g., via the inboard side. The middle and lower portions may, individually or collectively, include transforming portions that deploy into the cross-aisle, e.g., via extending across the cross-aisle or pivoting into the cross-aisle relative to a rotational axis. The transforming portions are deployable by a single hand (e.g., via an exterior latch) and create temporary workspaces and work surfaces for cabin crew in the otherwise unused cross-aisle. Alternatively, the transforming portions create temporary spaces for passengers to congregate or purchase refreshments inflight, while protecting the exit doors from unauthorized access.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 illustrates components of the transformable monument of FIG. 1;

FIGS. 9A through 9C illustrate a crosslink structural support system of the transformable monument of FIG. 1;

FIG. 13C illustrates a damping system of the multipurpose panel of FIGS. 13A and 13B;

FIG. 17B is an overhead view of the transformable monument system of FIG. 17A;

DETAILED DESCRIPTION OF EXEMPLARY EMBODIMENTS

Figure 1:
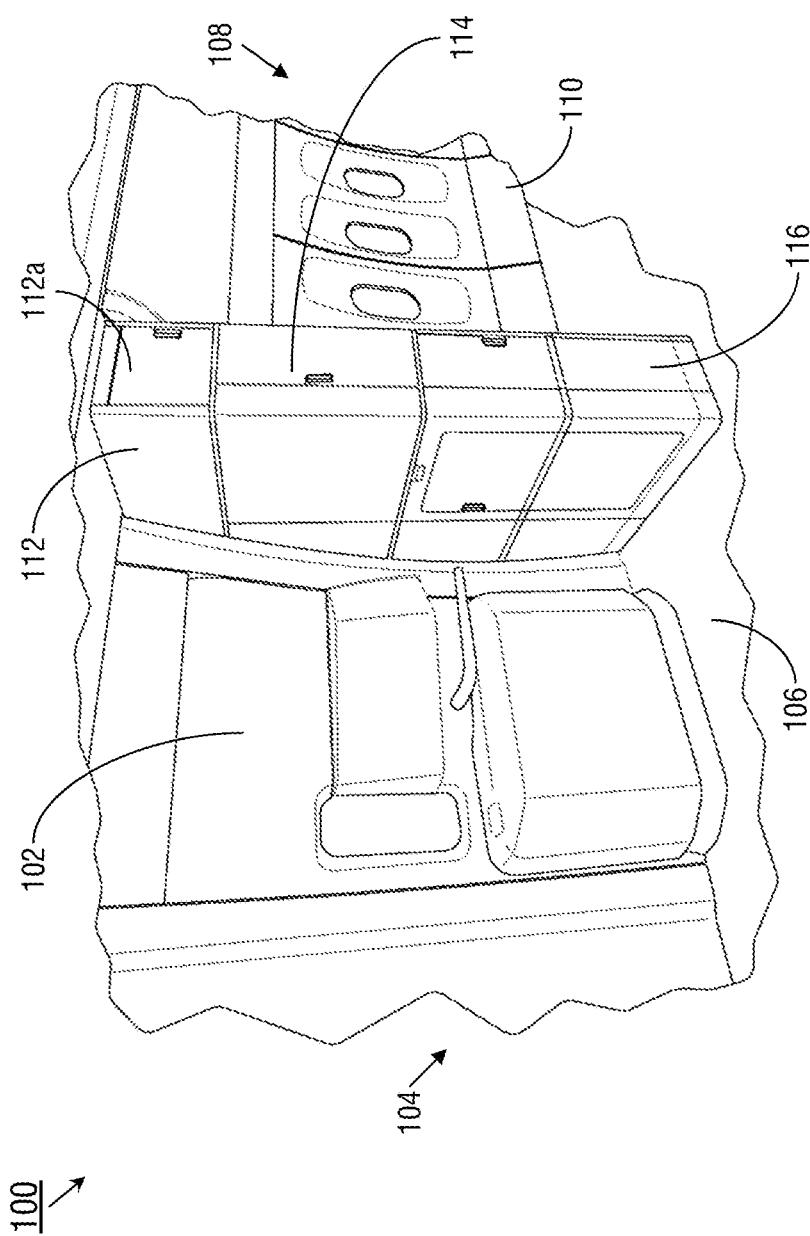
FIG. 1 is an isometric view of an exemplary embodiment of a transformable monument for a passenger cabin according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to multi-mode monuments transformable at cruising altitudes to provide cabin crew or passenger spaces adjacent to cabin doors. Transformable multi-mode monuments make productive use of otherwise underutilized space without encroaching on existing storage or passenger seating space. The resulting spaces may be used by cabin crew to facilitate passenger catering, or by passengers themselves as self-service or entertainment/socialization spaces. Additionally, the transformable portions of multi-mode monuments may, in their deployed configurations, protect the cabin doors from unauthorized access inflight. Transformable monuments may be deployed, either alone or in combinations, on both single-aisle and twin-aisle aircraft. Class division zones (e.g., between business and economy class) may provide secondary locations for deployment of transformable monuments.

Referring to FIG. 1, an exemplary embodiment of a transformable monument 100 according to the inventive concepts disclosed herein may be implemented proximate to an exit door 102 of an aircraft 104, separating the cross-aisle 106 (e.g., the doorway space extending laterally across the aircraft from the exit door) from a seating area (108) of the aircraft (e.g., passenger cabin). The transformable monument 100 may, on its outboard side, contour with a bulkhead (110) of the aircraft 104. The transformable monument 100 may be characterized as having an upper section (112), a middle section (114) directly below the upper section, and a lower section (116) directly below the middle section. For example, the upper section 112 may extend from approximately eye level to the ceiling (or the bulkhead 110) of the aircraft 104, while the lower section 116 may extend from approximately waist level to the floor of the passenger cabin. The upper section 112 may include storage compartments for crew equipment or passenger amenities, accessible on the inboard side (e.g., facing an aisle of the aircraft) via an inboard-side door (112a).

Figure 2A:
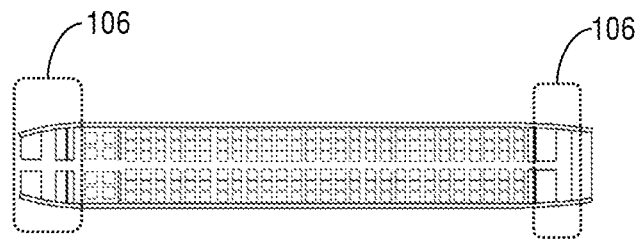
FIGS. 2A and 2B are overhead diagrammatic illustrations of aircraft indicating implementation locations for the transformable monument of FIG. 1.
Figure 2B:
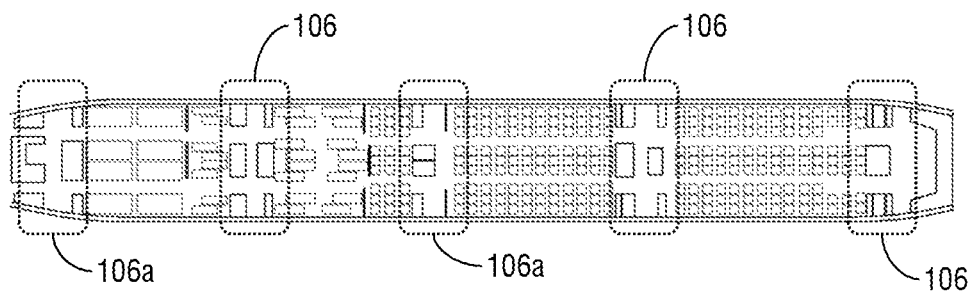

Referring to FIGS. 2A and 2B, the single-aisle aircraft 104a and twin-aisle aircraft 104b may be implemented and may function similarly to the aircraft 104 of FIG. 1, except that the aircraft 104a-b may maximize the efficient use of limited interior space by positioning the transformable monument 100 in otherwise unused or underused cross-aisles (106) immediately proximate to exit doors (102, FIG. 1). Referring in particular to FIG. 2B, the twin-aisle aircraft 104b may additionally implement the transformable monument 100 in class division spaces (106a) where, e.g., premium seats may be bounded or otherwise separated from economy-class seats.

Figure 2C:
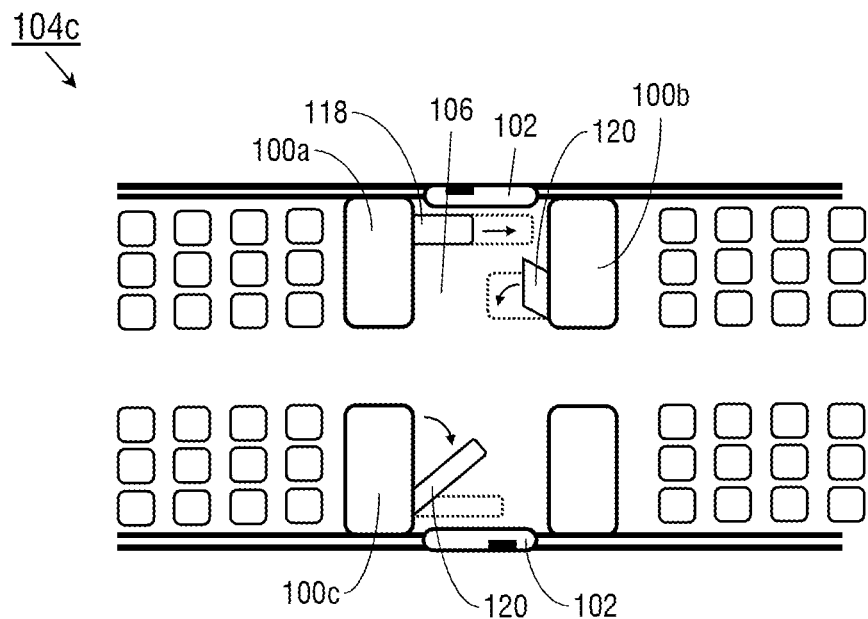
FIGS. 2C and 2D are overhead diagrammatic illustrations of aircraft indicating various configurations of the transformable monument of FIG. 1.

Referring to FIG. 2C, the aircraft 104c and transformable monuments 100a-c may be implemented and may function similarly to the aircraft 104a-b of FIGS. 2A and 2B and the transformable monument 100 of FIG. 1, except that the transformable monument 100a may incorporate an extendable section 118 that extends into the cross-aisle 106, e.g., substantially parallel to the longitudinal or roll axis of the aircraft 104c, to create a temporary space within the cross-aisle and at least partially obstruct the exit door 102 from unauthorized passenger access. The extendable section 118 may extend partially, or fully, across the cross-aisle 106 and may extend from either or both of the lower section (116, FIG. 1), the middle section (114, FIG. 1), or the upper section (112, FIG. 1) individually or collectively.

The transformable monument 100b may be implemented and may function similarly to the transformable monument 100a, except that the transformable monument 100b may incorporate a pivoting section 120 configured to pivot or unfold into the cross-aisle 106, e.g., relative to a horizontal pivotal or rotational axis substantially parallel to the lateral or pitch axis of the aircraft 104c, to create the temporary space.

The transformable monument 100c may be implemented and may function similarly to the transformable monument 100b, except that the pivoting section 120 of the transformable monument 100b may pivot into the cross-aisle, e.g., relative to a vertical pivotal or rotational axis substantially parallel to the z-axis or yaw axis of the aircraft 104c.

Figure 2D:
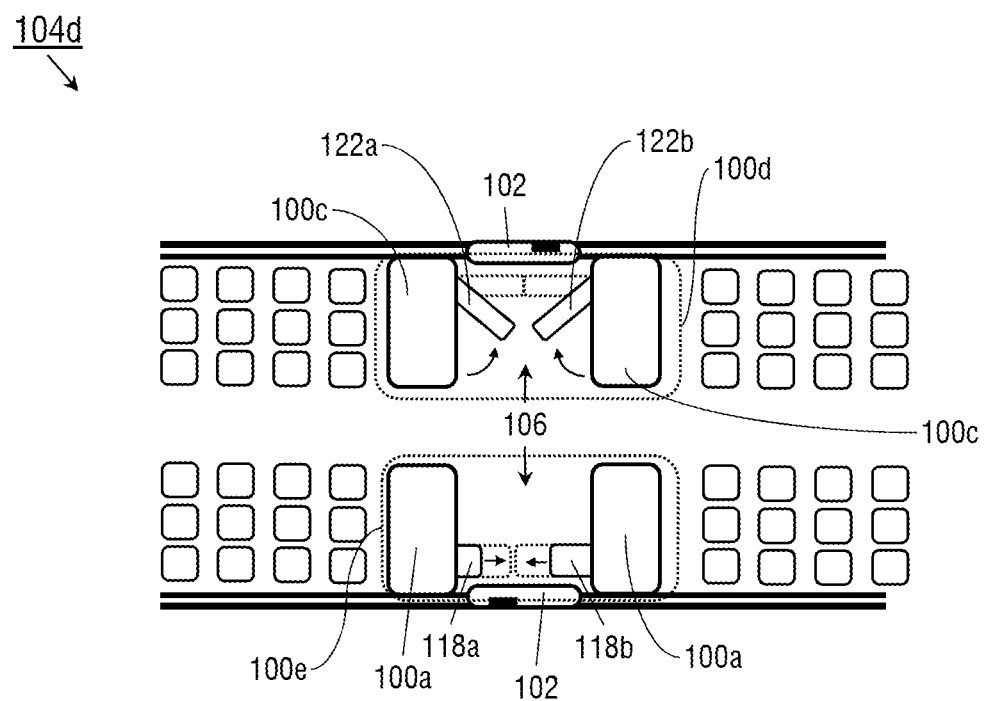

Referring to FIG. 2D, the transformable monument system 100d may be implemented and may function similarly to the transformable monument 100c of FIG. 2C, except that the transformable monument system 100d may incorporate a pair of transformable monuments 100c on either side of the cross-aisle 106. For example, each transformable monument 100c may incorporate a pivoting section (120a-b) that pivots into the cross-aisle 106, the pivoting sections 120a-b collectively creating the temporary space and obstructing the exit door 102.

The transformable monument system 100e may be implemented and may function similarly to the transformable monument system 100d, except that the transformable monument system 100e may incorporate a pair of transformable monuments 100a on either side of the cross-aisle 106b, the extendable sections 118a-b of each transformable monument 100a extending into the cross-aisle 106 to create the temporary space and obstruct the exit door 102.

Referring to FIG. 3, the transformable monument 100f may be implemented and may function similarly to the transformable monument 100a of FIG. 2C, except that the transformable monument 100f may include in its lower portion (116) an endcap (122) as well as upper and lower table leaves 124, 126 capable of deploying into the cross-aisle 106 to create a multi-level temporary work surface for cabin crew. In addition, the middle portion (114) of the transformable monument 100f may include a self-service compartment (128) for the storage of refreshments (130) accessible by cabin crew (e.g., for passenger catering) or accessible by the passengers themselves (e.g., once the aircraft 104 has reached safe cruising altitude).

Figure 4A:
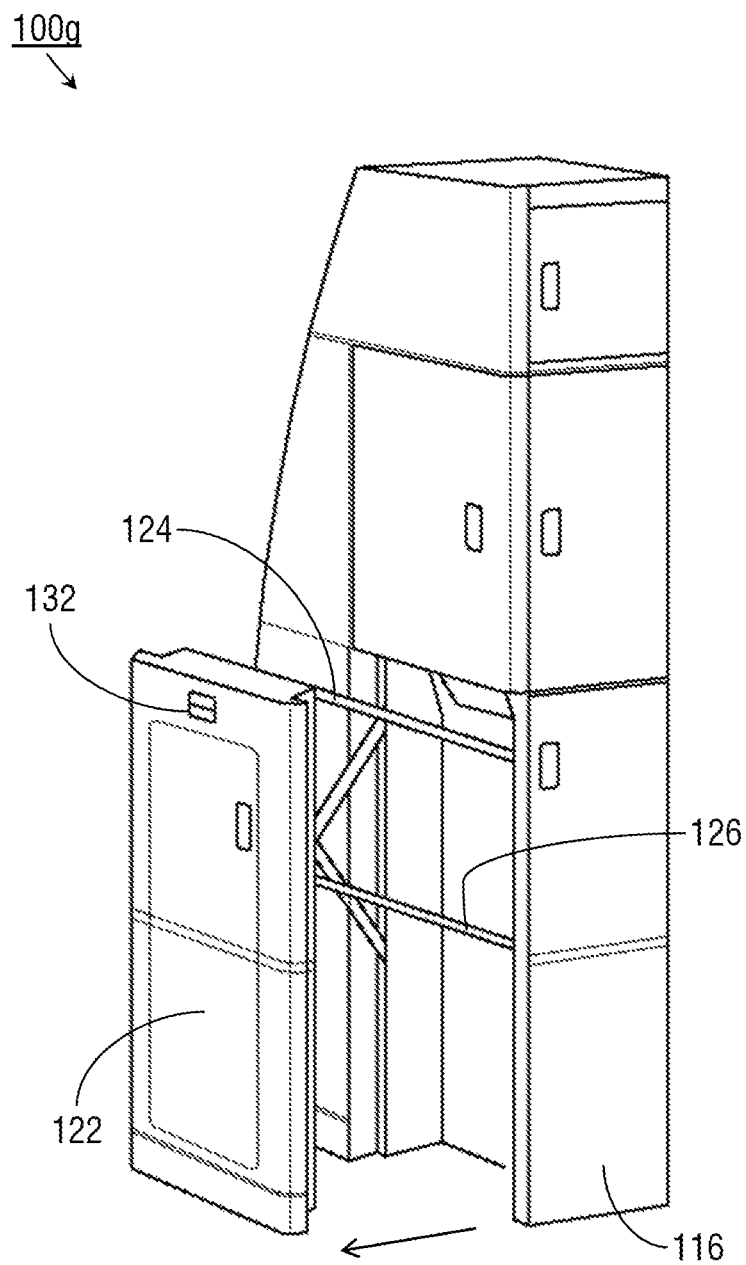
FIGS. 4A and 4B illustrate transformation operations of the transformable monument of FIG. 1.

Referring to FIG. 4A, the transformable monument 100g may be implemented and may function similarly to the transformable monument 100f of FIG. 3, except that the upper and lower table leaves 124, 126 of the transformable monument 100g may be deployed by an exterior latch (132) in the endcap 122 of the lower portion 116. For example, during taxi, takeoff, and landing (TTL) flight segments, the transformable monument 100g may remain locked in a default or closed configuration, e.g., as shown by the transformable monument 100 of FIG. 1. The exterior latch 132 may be configured for actuation by a single hand, e.g., the left or right hand of a cabin crewmember. By pulling upward on the exterior latch 132, the locking mechanism for the upper and lower table leaves 124, 126 may be released.

Figure 4B:
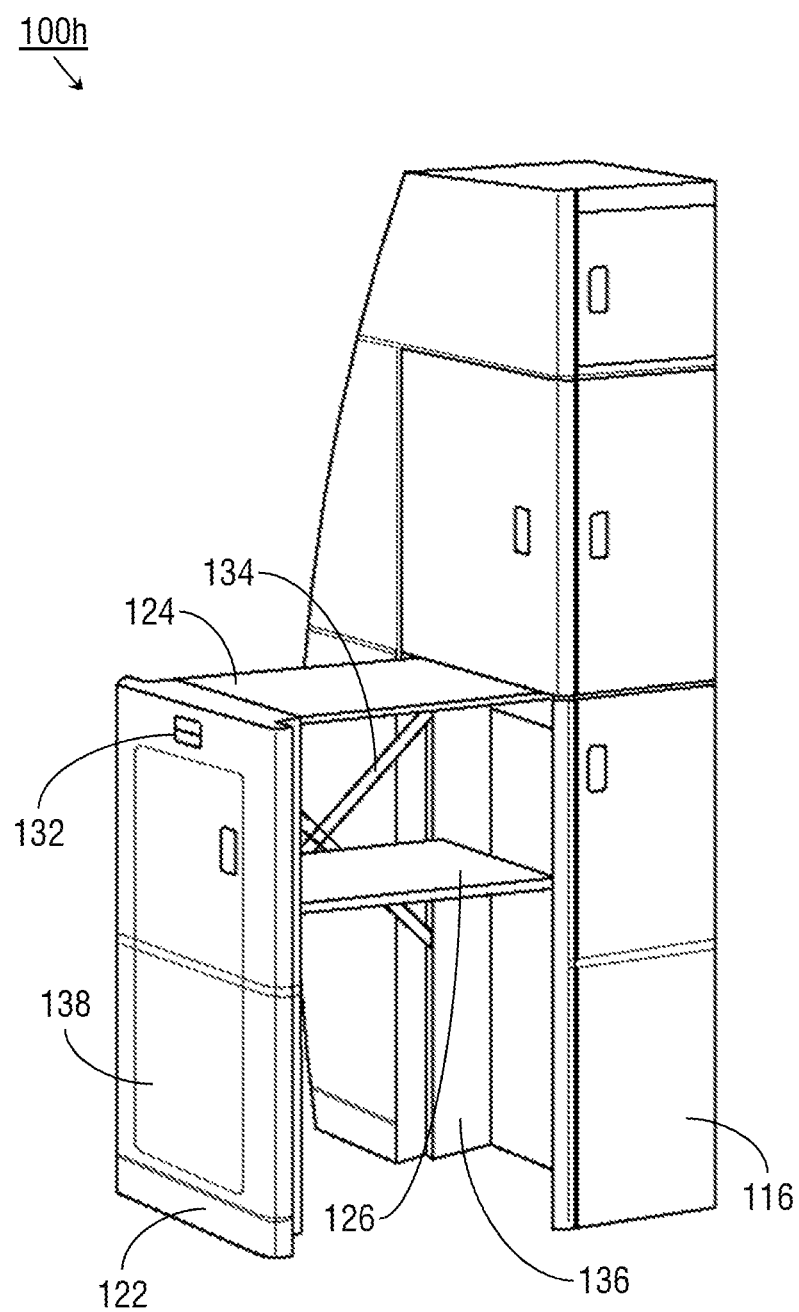

Referring to FIG. 4B, the transformable monument 100h may be implemented and may function similarly to the transformable monument 100g of FIG. 4A, except that the upper and lower table leaves 124, 126 of the transformable monument 100h, once unlocked by the actuation of the exterior latch 132, may track upward and outward (e.g., in a longitudinal or forward direction substantially parallel with the roll axis of the aircraft 104, into the cross-aisle (106, FIG. 3)) and into the deployed position shown by FIG. 4B. The upper and lower table leaves 124, 126 may lock into the deployed position for use as temporary work surfaces. A crewmember may similarly unlock the upper and lower table leaves 124, 126 by pulling upward with a single hand on the exterior latch 132 and pushing inward, folding the upper and lower table leaves back into the closed position shown by FIG. 1. The deployment of the upper and lower table leaves 124, 126 may be assisted, and the deployed position of the upper and lower table leaves may be stabilized, by a crosslink system (134) on the outboard side of the transformable monument 100h. For example, the crosslink system 134 may link the endcap 122 to an outboard track plate (136) inside the lower portion 116, pivoting and expanding as the upper and lower table leaves 124, 126 deploy. In some embodiments, the endcap 122 may include additional auxiliary storage accessible via an auxiliary storage door (138) that opens into the cross-aisle 106.

Figure 5A:
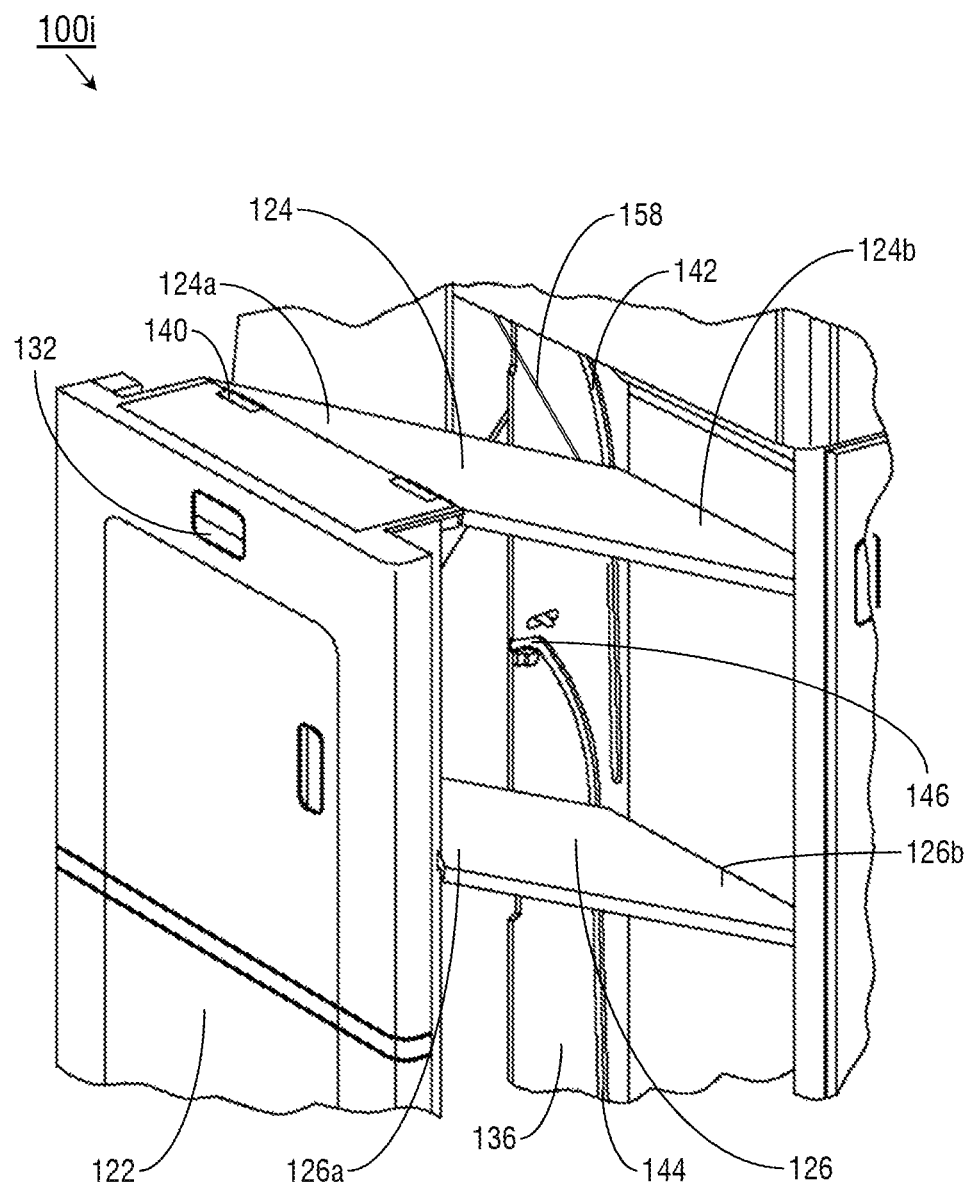
FIGS. 5A through 5C illustrate components of the transformable monument of FIG. 1.

Referring to FIG. 5A, the transformable monument 100i may be implemented and may function similarly to the transformable monument 100h of FIG. 4B, except that the upper and lower table leaves 124, 126 may be pivotably attached to the endcap 122 by rotary latches (140) configured to lock the upper and lower table leaves in the default closed position (e.g., as shown by FIG. 1) until actuation of the exterior latch 132. The upper and lower table leaves 124, 126 may be connected to the endcap 122 by the rotary latches 140 at their forward ends 124a, 126a (e.g., proximate to the exit door (102, FIG. 1)) while their tail ends (124b, 126b) track upward and outward into the deployed position. The rotary latches 140 allow the forward ends 124a, 126a of the upper and lower table leaves 124, 126 to pivot in place relative to the endcap 122 as the tail ends 124b, 126b of the upper and lower table leaves translate upward and the upper and lower table leaves deploy.

The lower portion 116 of the transformable monument 100i may include track plates 136 on both the inboard and outboard sides of the upper and lower table leaves 124, 126. Tracks 142, 144 may be machined into each track plate 136; the tail ends 124b, 126b of the upper and lower table leaves 124, 126 may track generally upward and outward toward a substantially horizontal terminal section (146) for supporting the table leaves in the deployed position.

Figure 5B:
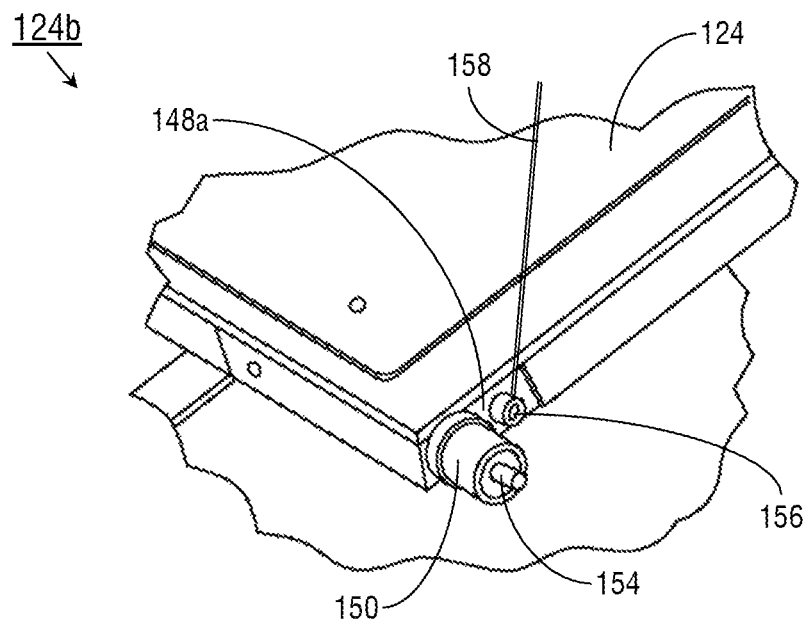
Figure 5C:
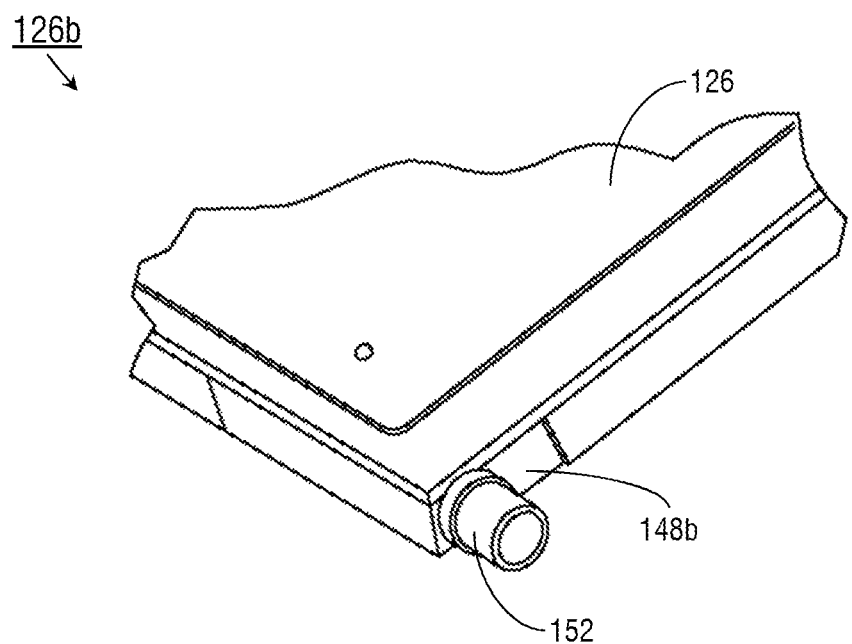

Referring also to FIGS. 5B and 5C, the tail end 124b of the upper table leaf 124 and the tail end 126b of the lower table leaf 126 may include leaf latches 148a-b incorporating sleeve bearings 150, 152 that track upward and downward along the tracks 142, 144 set into the track plates 136. Referring in particular to FIG. 5B, the sleeve bearing 150 of the upper table leaf 124 may incorporate a spring-loaded locking pin (154). When the upper and lower table leaves 124, 126 reach their fully deployed position (e.g., the sleeve bearings 150, 152 reach the terminal section (146) of the tracks 142, 144), the spring-loaded locking pin 154 may extend into a hole or slot (not shown) in the track plate 136, locking the upper and lower table leaves into the deployed position. Referring in particular to FIGS. 5A and 5B, the deployment of the upper and lower table leaves 124, 126 may be further assisted by a cable retractor 156 (e.g., a 5-pound constant-force cable retractor) and tensioned cable 158 operating independently of the exterior latch 132. For example, the leaf latch 148a attached to the tail end (124a) of the upper table leaf 124 may include the cable retractor 156, which may be connected to the track plate 136 by the tensioned cable 158. By pulling on the tensioned cable 158, the cable retractor 156 may assist the upper and lower table leaves 124, 126 in deploying from the default closed position (shown by FIG. 1) to the fully deployed position (shown by FIG. 4B).

Figure 6A:
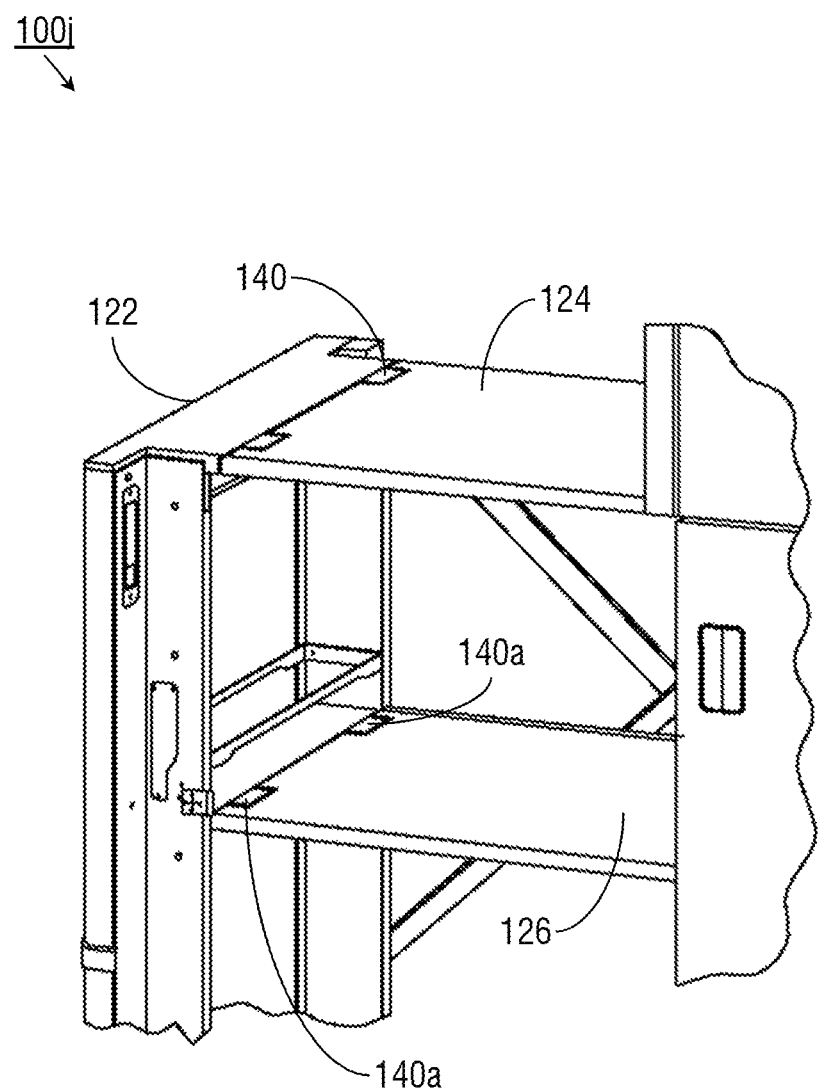
FIGS. 6A through 6D illustrate components of the transformable monument of FIG. 1.

Referring to FIG. 6A, the transformable monument 100j may be implemented and may function similarly to the transformable monument 100i of FIG. 5A, except that the lower table leaf 126 of the transformable monument 100j may be pivotably connected to the endcap 122 by rotary latches 140a.

Figure 6B:
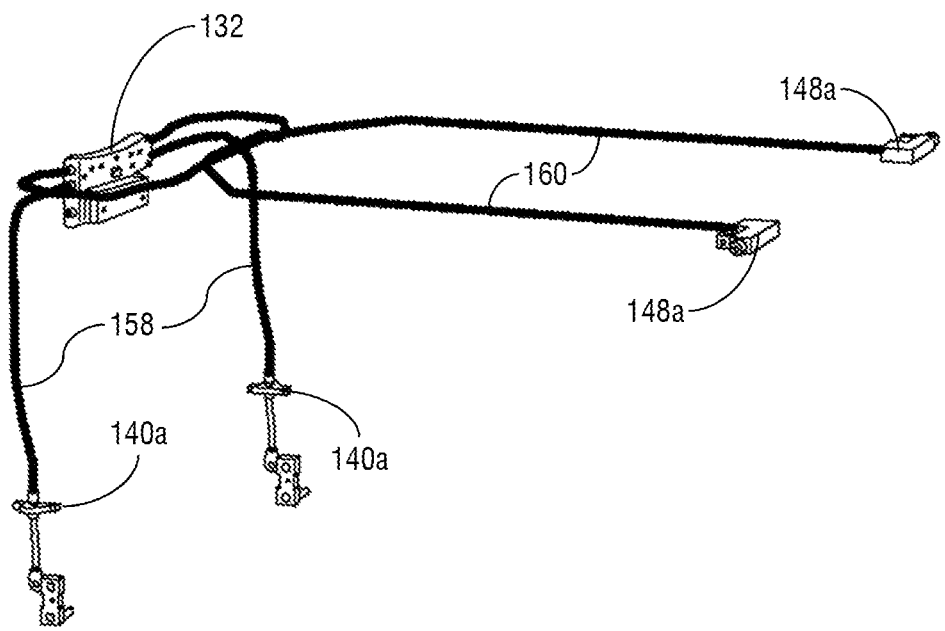

Referring also to FIG. 6B, unlike the rotary latches 140 connecting the upper table leaf 124 to the endcap 122, the rotary latches 140a may be linked to the exterior latch 132 by rotary latch cables 158. Similarly, the exterior latch 132 may be linked to the leaf latches 148a of the upper table leaf 124 by leaf latch cables 160. Actuating the exterior latch 132 may pull the rotary latch cables 158 and leaf latch cables 160, unlocking the rotary latches 140a and leaf latches 148a and unlocking the upper and lower table leaves 124, 126 from the default closed position, allowing the upper and lower table leaves to be deployed.

Figure 6C:
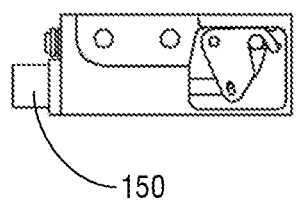
Figure 6D:
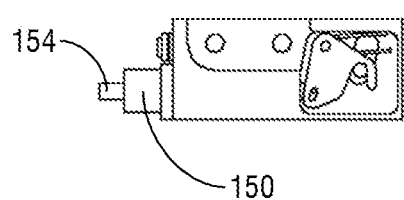

Referring also to FIG. 6C, the leaf latch 148c may be implemented and may function similarly to the leaf latches 148a of FIG. 6B, except that the leaf latch 148c may be in an open position, allowing the upper and lower table leaves 124, 126 (FIG. 6A) to deploy. Referring to FIG. 6D, the leaf latch 148d may be implemented and may function similarly to the leaf latch 148c of FIG. 6C, except that when the endcap 122 (FIG. 6A) is fully extended and the upper and lower table leaves 124, 126 are fully deployed, the spring-loaded pin 154 may extend from the sleeve bearing 150 and into the corresponding hole in the track plate (136, FIG. 5A), locking the upper and lower table leaves 124, 126 into the deployed open position (shown by FIG. 4B).

Figure 7A:
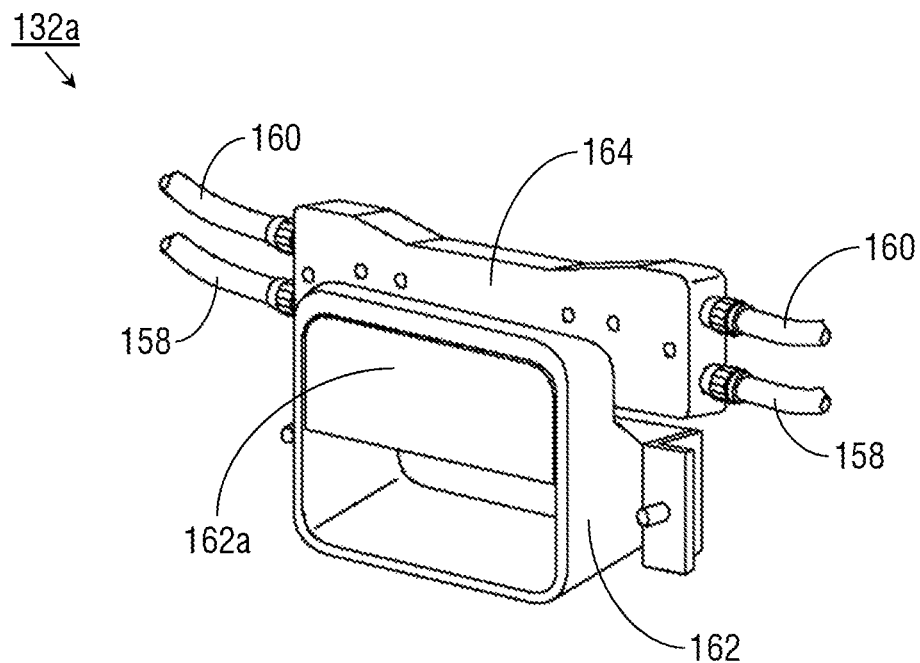
FIGS. 7A and 7B are respectively exterior and interior views of a cable actuation system of the of the transformable monument of FIG. 1 in a closed or default state.
Figure 7B:
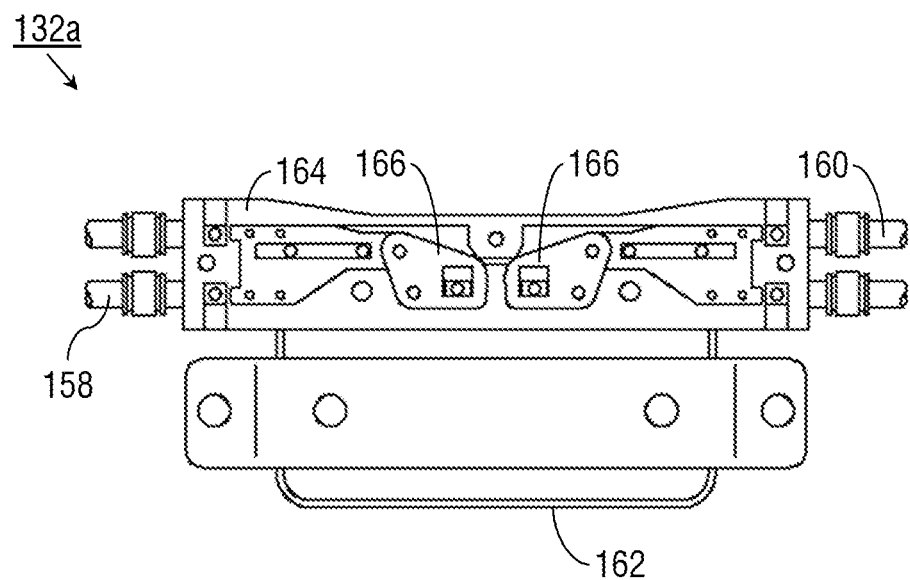

Referring to FIGS. 7A and 7B, the exterior latch 132a may be implemented and may function similarly to the exterior latch 132 of FIG. 6B, except that the exterior latch 132a may include a handle assembly (162) and cable actuator (164). For example, the handle assembly 162 (including the handle 162a) may be mounted on the exterior face of the endcap 122 (see also, e.g., FIG. 5A) while the cable actuator 164 may be mounted inside the endcap 122 directly opposite the handle assembly. The rotary latch cables 158 and leaf latch cables 160 may terminate at the cable actuator 164. Torsion springs (not shown) may hold the cable actuator 164 in the default, closed position while the exterior latch 132a remains unactuated.

Figure 8A:
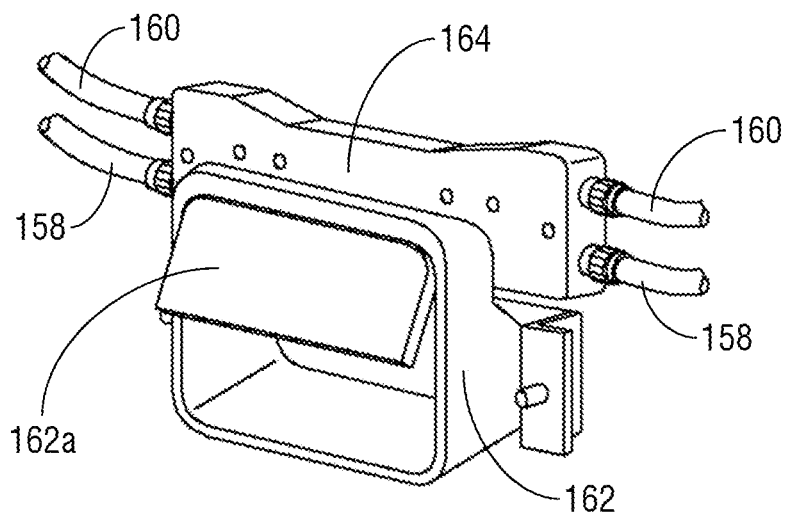
FIGS. 8A and 8B are respectively exterior and interior views of a cable actuation system of the of the transformable monument of FIG. 1 in an open or deployed state.
Figure 8B:
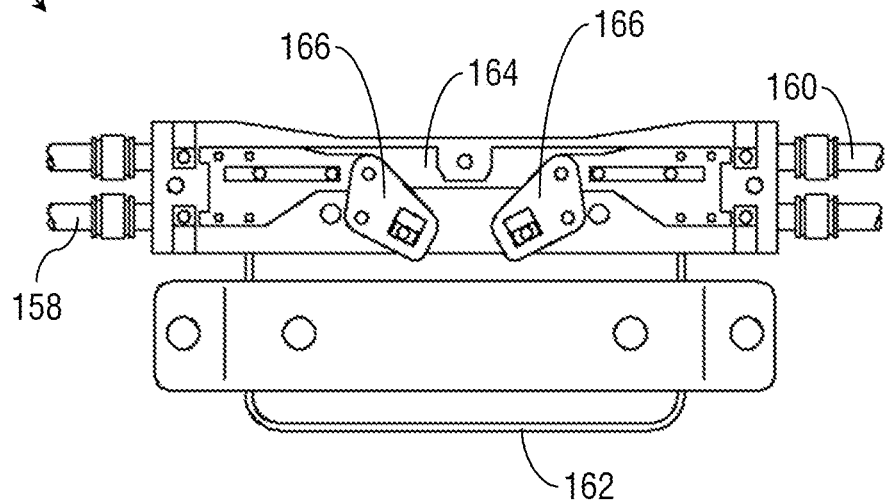

Referring to FIGS. 8A and 8B, the exterior latch 132b may be implemented and may function similarly to the exterior latch 132a of FIGS. 7A/B, except that the exterior latch 132b may be deployed by a cabin crewmember by pulling upward the handle (162a) with either hand. Pulling up the handle 162a causes rockers (166) in the cable actuator 164 to be pulled downward, simultaneously pulling all four of the rotary latch cables 158 and leaf latch cables 160 and unlocking the upper and lower table leaves 124, 126 (FIG. 6A) for deployment to the open deployed position.

Figure 9A:
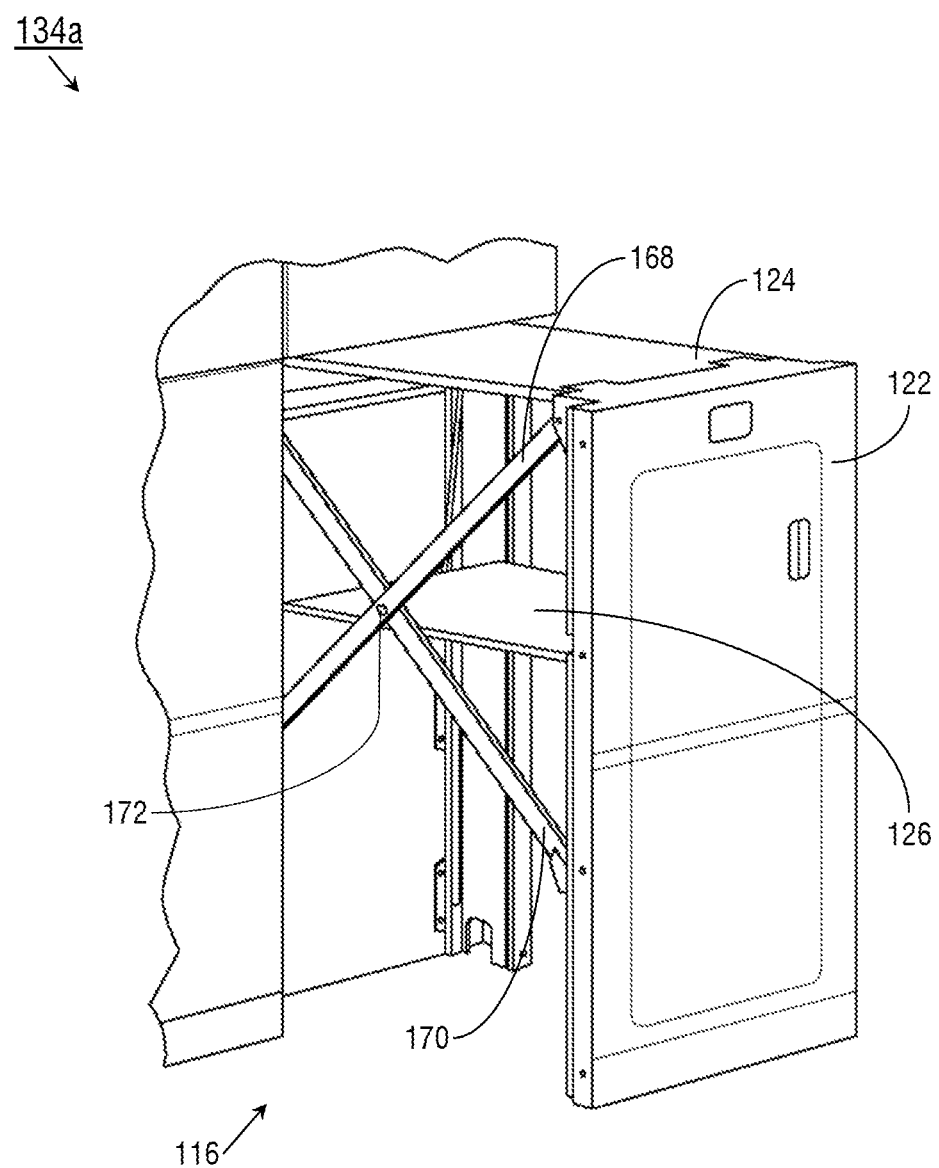

Referring to FIGS. 9A and 9B, the crosslink system 134a may be implemented and may function similarly to the crosslink system 134 of FIG. 4B, except that the crosslink system 134a may include two crossing members 168, 170 centrally linked by a pivot pin (172) or similar mechanism at their midpoints (e.g., through holes or openings at the midpoint of each crossing member). The crosslink system 134a may be implemented on the outboard side (e.g., facing the exit door (102, FIG. 1)) of the lower portion (116) of the transformable monument (100, FIG. 1) to stabilize the upper and lower table leaves 124, 126 in the open and deployed position. For example, the crossing member 168 may pivotably connect the interior of the endcap 122 (proximate to the upper table leaf 124 and the outboard rotary latch 140) to the outboard track plate (136, FIG. 4B) while the crossing member 170 may pivotably connect the outboard track plate 136 (proximate to the upper table leaf 124 and the outboard leaf latch 148a (FIG. 5B)) to the interior of the endcap 122 below its connection point to the crossing member 168.

Referring also to FIG. 9B, the crossing members 168, 170 may each, at their lower points of connection with the outboard track plate 136 and the endcap 122 respectively, track within substantially vertical linear guides 174, 176. For example, when the endcap 122 is fully extended and the upper and lower table leaves 124, 126 fully deployed, the crossing members 168, 170 may be fully extended (e.g., wherein the vertical angle 178 between the crossing members reaches its maximum) and their points of connection may reach the high terminal points (174a, 176a) of the linear guides 174, 176. The linear guides 174, 176 may prevent the crossing members 168, 170 from extending any further and help to stabilize the upper and lower table leaves 124, 126 in the fully deployed position.

Referring to FIG. 9C, the crosslink system 134b may be implemented and may function similarly to the crosslink system 134a of FIG. 9B, except that when the upper and lower table leaves 124, 126 are unlocked from the open, fully deployed positions and retracted back into the lower portion 116, the crossing members 168, 170 may track downward in the linear guides 174, 176 until reaching the low terminal points (174b, 176b), at which point the horizontal angle (178a) between the crossing members 166, 170 may reach its maximum and the upper and lower table leaves 124, 126 are locked into the default, closed position.

Figure 10:
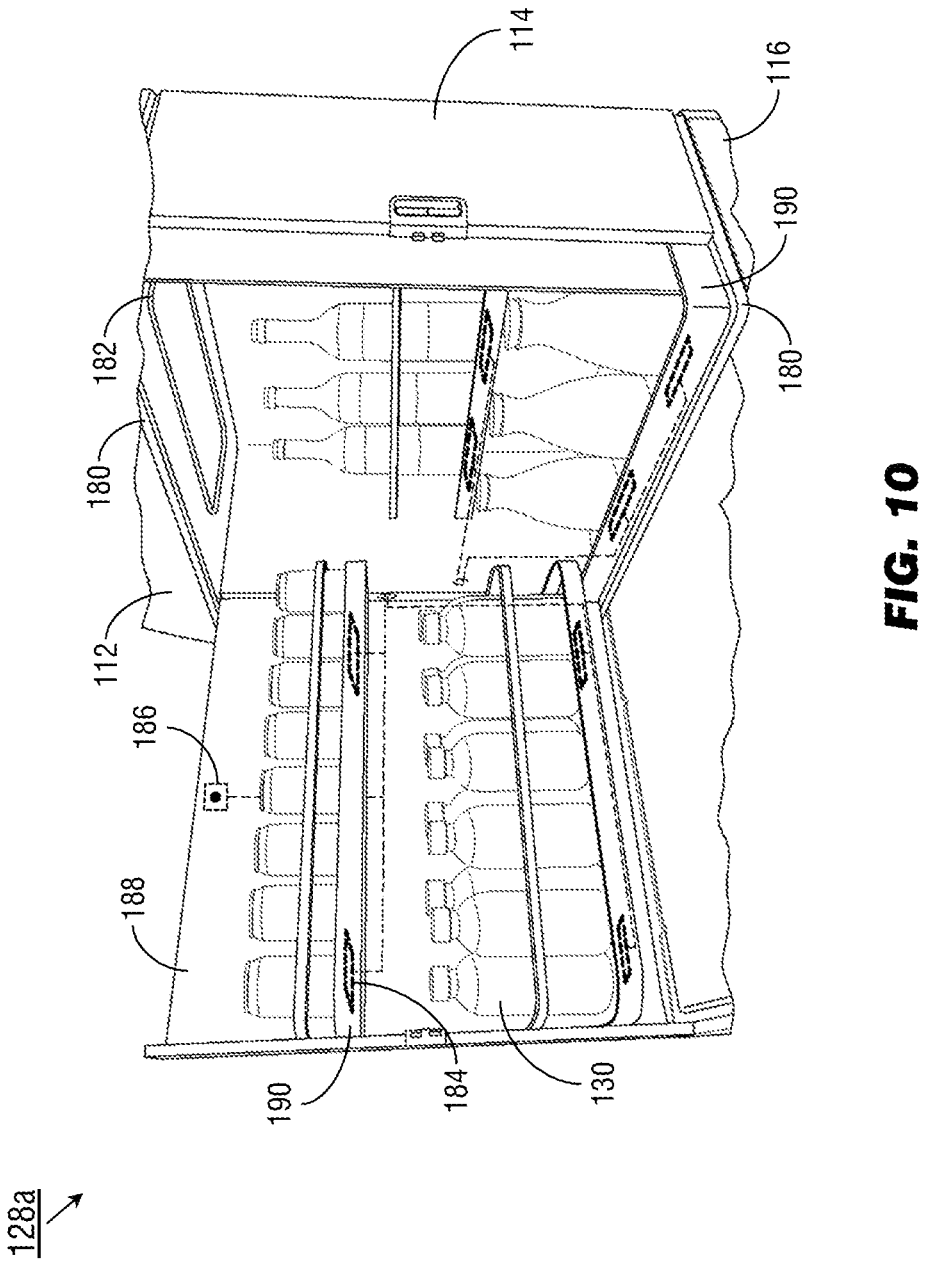
FIG. 10 illustrates a self-service compartment of the transformable monument of FIG. 1.

Referring to FIG. 10, the self-service compartment 128a may be implemented and may function similarly to the self-service compartment 128 of FIG. 3, except that the self-service compartment 128a may include edge lighting elements 180, interior lighting 182, inventory sensors 182, and a camera 184. For example, edge lighting elements 180 may demarcate the boundaries of the middle portion 114 of the transformable monument (100, FIG. 1) with respect to the upper portion 112 and lower portion 116. The edge lighting elements 180 may be connected to an aircraft network controller to be activated, deactivated, or adjusted based on command input entered by a cabin crewmember, or due to other predetermined or preprogrammed factors. For example, the edge lighting elements 180, in concert with other cabin lighting, may be dimmed or brightened, or its output spectrally shifted, based on the current time or on a current flight segment. Interior lighting 182 may illuminate the contents of the self-service compartment 128a, activating when the door (188) of the self-service compartment is opened. The self-service compartment 128a may be a room-temperature compartment for the storage of refreshments (130) at or near the ambient cabin temperature, or the self-service compartment may be equipped with a chiller (e.g., air-cooled or conductive chiller) or heating element (not shown) for regulating the storage temperature of the refreshments 130. The interior lighting 182 (as well as the inventory sensors 184 and any chiller/warmer elements) may be powered by the aircraft power system (e.g., as a galley insert (GAIN)) and connected to a galley network controller (GNC) or other aircraft controller configured to adjust the output of the interior lighting based on the contents or status of the self-service compartment 128a. For example, the interior lighting 182 may be tinted blue to indicate a chiller compartment, tinted red to indicate a warmer compartment, flashed or blinked to instruct passengers to return to their seats, or dimmed to indicate a compartment that is nearly or fully empty. Cabin crewmembers may use the self-service compartment 128a to dispense refreshments (130) to passengers throughout the course of catering and service operations. However, in the alternative passengers may (during the appropriate flight segments, e.g., at a safe cruising altitude) use the cross-aisle (106, FIG. 1) immediately proximate to the transformable monument 100 as a congregational or social area (e.g., provided the extendable portion (118, FIG. 2C) in the lower portion 116 is not deployed) and self-serve refreshments 130 from the self-service compartment 128a.

The interior shelves and compartments (190) of the self-service compartment 128a may include inventory sensors (184) for determining when a refreshment item (130) has been removed from the shelf, e.g., by a change in weight or pressure. The inventory sensors 184 may thus track the inventory of each self-service compartment 128a (e.g., by forwarding inventory tracking information to an aircraft network or galley network controller) or alert cabin crew to shortages of any particular item (e.g., by messaging a mobile communications or computing device carried by a crewmember). The camera 186 may activate whenever a removal is detected by the inventory sensors 184; for example, if a passenger removes a refreshment item (130) the camera may capture one or more images in response to the detected removal, and forward the images to an aircraft network controller or other like control processor for analysis of the image. For example, the network controller may attempt to positively identify the passenger via image recognition (e.g., facial recognition, comparison to a reference image, or detection of a QR code or similar visually encoded data held or worn by the passenger to facilitate use of the self-service compartment 128a) so that the correct passenger may be charged for any refreshment items 130 removed from the self-service compartment.

Figure 11:
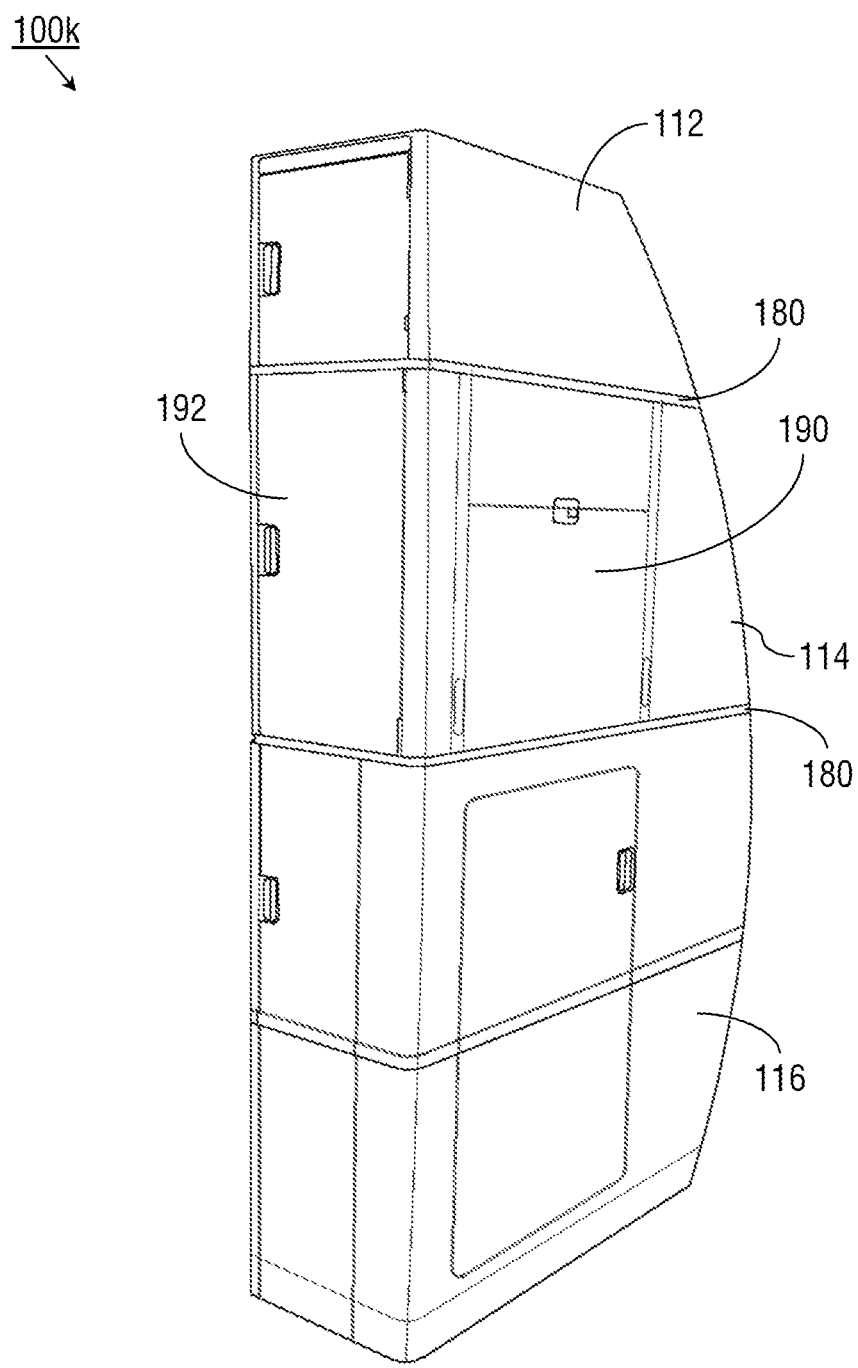
FIG. 11 is an isometric view of a transformable monument according to embodiments of the inventive concepts disclosed herein.

Referring to FIG. 11, a transformable monument 100k may be implemented and may function similarly to the transformable monument 100b of FIG. 2C, except that the transformable monument 100k may include, within its middle portion 114, a multipurpose panel (190) set into the inward side (e.g., the side proximate the cross-aisle (106, FIG. 1)). The multipurpose panel 190 may be implemented and may function similarly to the pivoting portion 120 of FIG. 2C, except that in its deployed state the multipurpose panel 190 may reveal, within the middle portion 114, inboard-accessible storage (e.g., through a door 192 opening into the cross-aisle) for crew equipment or two standard units (SU). It is contemplated that the multipurpose panel 190 may have an overall thickness of no more than 1.5 inches, such that the multipurpose panel may be integrated into a new transforming monument 100k or retrofitted into an existing monument. Similarly to the transformable monuments shown by, e.g., FIGS. 1 and 10, the transformable monument 100k may include edge lighting elements 180 demarcating the upper portion 112, the middle portion 114, and the lower portion 116; the edge lighting elements 180 may be communicatively linked to an aircraft network controller configured to activate, deactivate, dim, brighten, or shift the luminous output of the edge lighting elements in concert with other cabin lighting, e.g., based on the current time or current flight segment.

Figure 12:
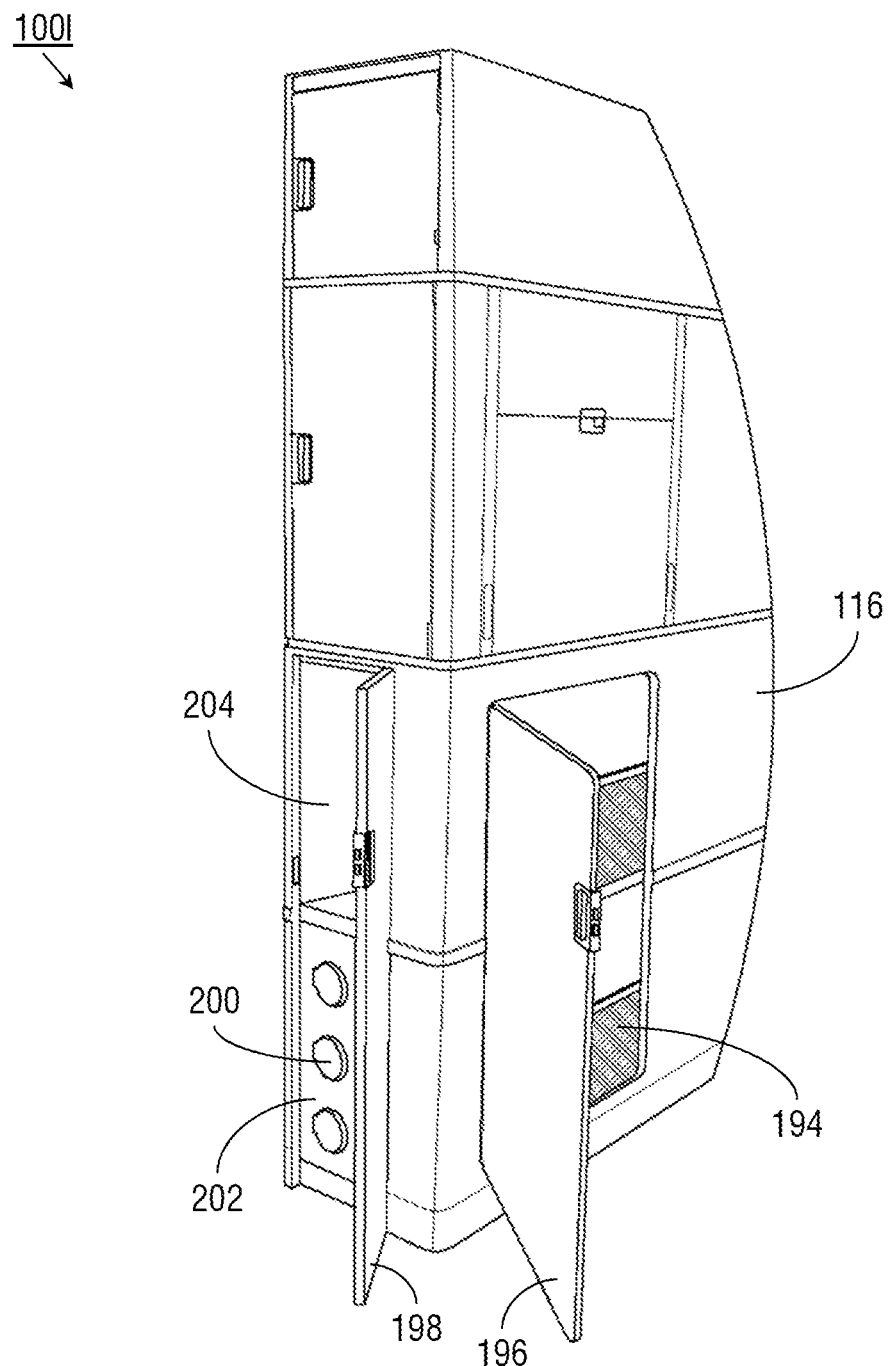
FIG. 12 illustrates storage components of the transformable monument of FIG. 11.

Referring to FIG. 12, a multipurpose station (transformable) monument 100l may be implemented and may function similarly to the transformable monument 100k of FIG. 11, except that the transformable monument 100l may include, within its lower portion 116, longitudinally-accessible storage 194 (e.g., through a door 196 opening in a forward or aft direction) for crew equipment or passenger amenities as well as inboard-accessible storage (e.g., through a door 198 opening into the aisle) for oxygen containers (200) (e.g., in the lowermost lower portion 202) and crew equipment (e.g., in the uppermost lower portion 204).

Figure 13A:
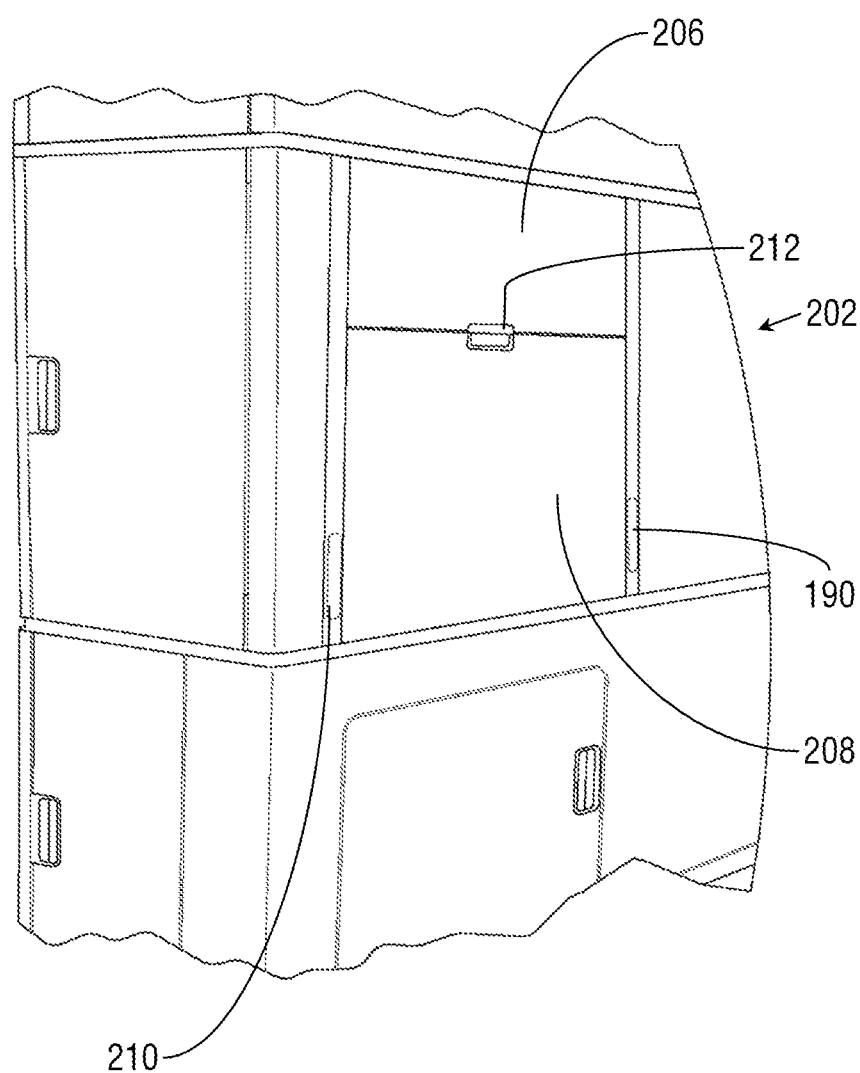
FIG. 13A illustrates a multipurpose panel of the transformable monument of FIG. 1 in a closed or default state.

Referring to FIG. 13A, the middle portion 114a may be implemented and may function similar to the middle portion 114 of the transformable monument 100l of FIG. 11, except that the middle portion 114a may include a multipurpose panel 190 divided into a charging-compartment cover (206) and a deployable surface (208) covering substantially the top third and the bottom two-thirds respectively of the multipurpose panel 190. The middle portion 114a may include deployable hooks (210) on either side of the multipurpose panel 190; the deployable hooks 210 may be magnetically secured into place until deployed by pressing on the upper end. The multipurpose panel 190 may be deployed, e.g., by pressing on the exterior latch (212), e.g., with a single hand.

Figure 13B:
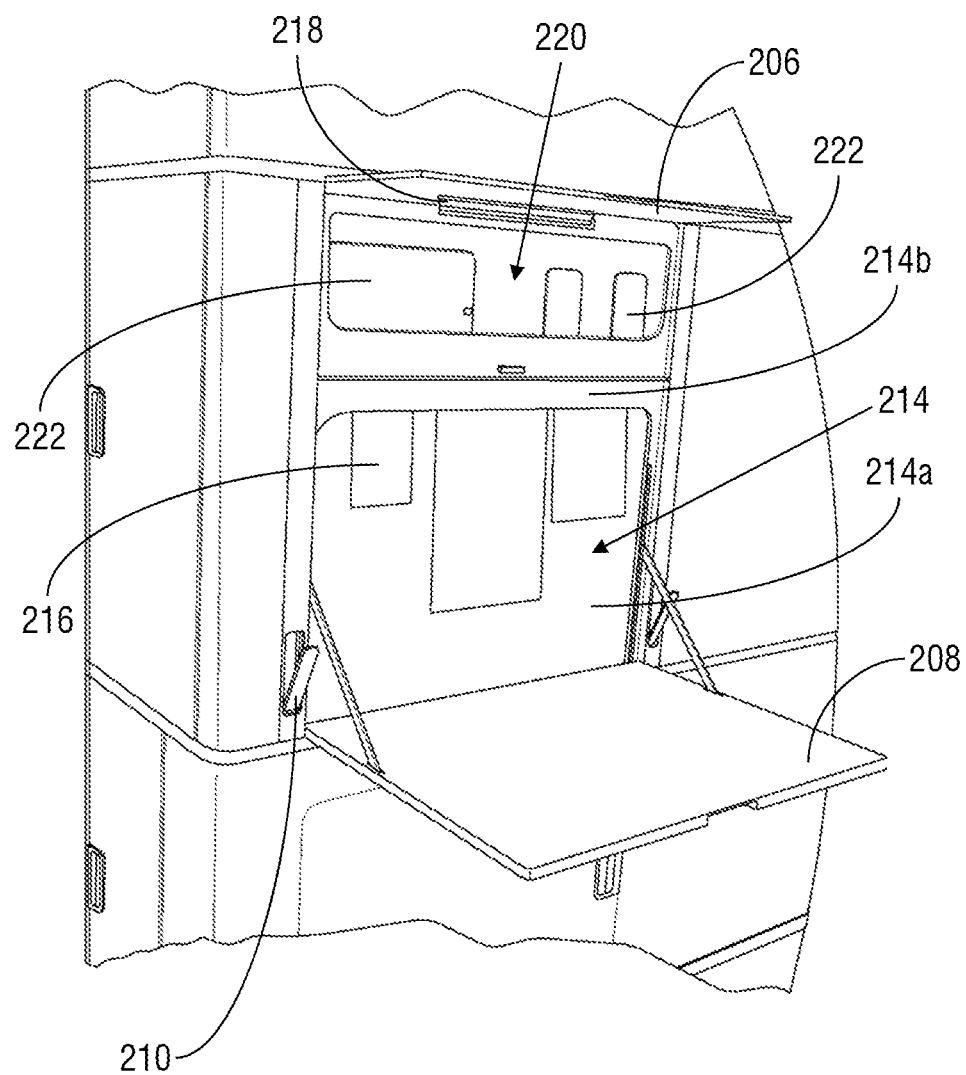
FIG. 13B illustrates the multipurpose panel of FIG. 13A in an open or deployed state.

Referring to FIG. 13B, the multipurpose panel 190a may be implemented and may function similar to the multipurpose panel 190 of FIG. 13A, except that upon deployment (e.g., by pressing the exterior latch 212 (FIG. 13A)), the charging-compartment cover 206 of the multipurpose panel 190a may pivot upward, and the deployable surface 208 may deploy downward, into a substantially horizontal work surface of c. 500 in$^2$. The deployable surface 208 may deploy downward to reveal a note holder 214 to which notes (216) or small sheets of paper may be secured in place (e.g., by pressing a lower portion 214a backwards to secure the note between the lower portion and an upper portion 214b). The deployable hooks (210) may, in their deployed state, be used to secure trash bags or other objects. The charging-compartment cover 206 may pivot upward to reveal a downward-oriented work light (218) and a charging compartment (220) configured to wirelessly and inductively charge any suitably equipped mobile devices (222; e.g., smartphones, tablets) placed therein.

Referring to FIG. 13C, the multipurpose panel 190b may be implemented and may function similarly to the multipurpose panel 190a of FIG. 13B, except that the multipurpose panel 190b may include a damping system. The damping system allows the deployable surface 208 to deploy downward at a consistent and regulated rate, providing for single-hand deployment of the multipurpose panel 190b (e.g., via the exterior latch 212). For example, the deployable surface 208 may be connected to the multipurpose panel 190b by fixed pivot points (224) and support struts (226) which translate upward or downward along a table strut track (228) as the deployable surface 208 is opened or closed. For example, when the deployable surface 208 is deployed by the exterior latch 212, the support struts 226 may track downward along the table strut track 228, the tracking speed of the support struts (and the speed with which the deployable surface opens) regulated by the compression of a gas spring (230) or like damper.

Figure 14A:
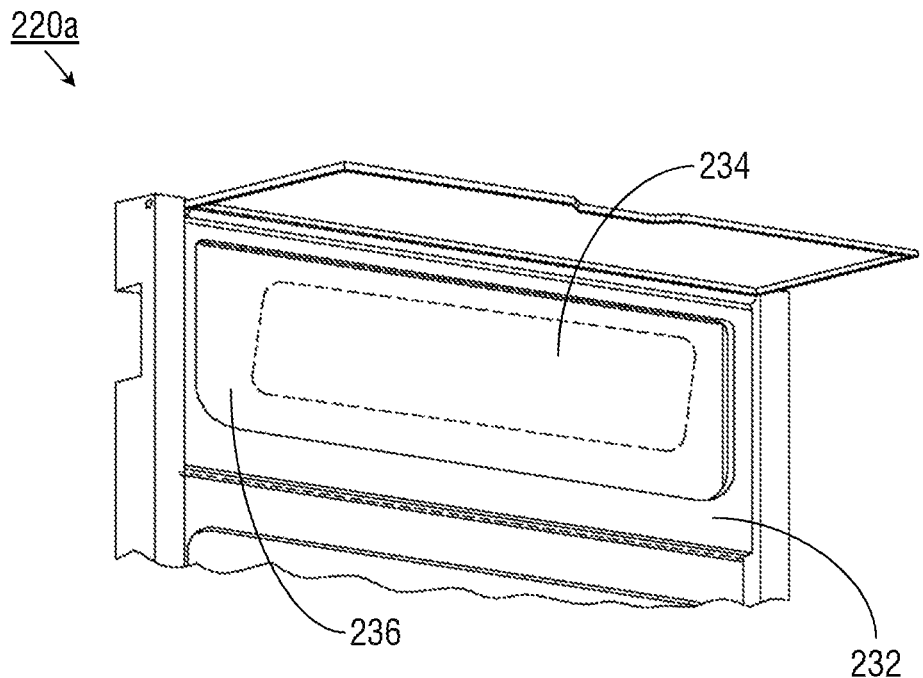
FIGS. 14A and 14B illustrate a charging compartment of the multipurpose panel of FIG. 11.
Figure 14B:
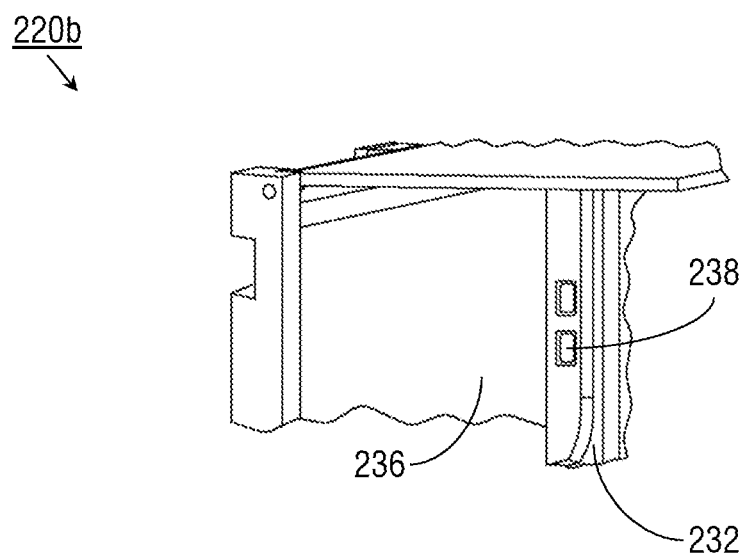

Referring to FIG. 14A, the charging compartment 220a may be implemented and may function similarly to the charging compartment 220 of FIG. 13B, except that the charging compartment 220a may include a pocket (232) for securing any mobile devices (222, FIG. 13B) placed therein and a wireless inductive charger (234) embedded within the rear panel (236) of the charging compartment. Referring in particular to FIG. 14B, the charging compartment 220b may be implemented and may function similarly to the charging compartment 220a of FIG. 14A, except that the charging compartment 220b may include USB ports (238) or other like charging or connection ports for connecting mobile devices 222 incapable of wireless or inductive charging. For example, the USB ports 238 may be situated within a side interior panel of the charging compartment 220b, behind the pocket 232 and the rear panel 236.

Figure 15:
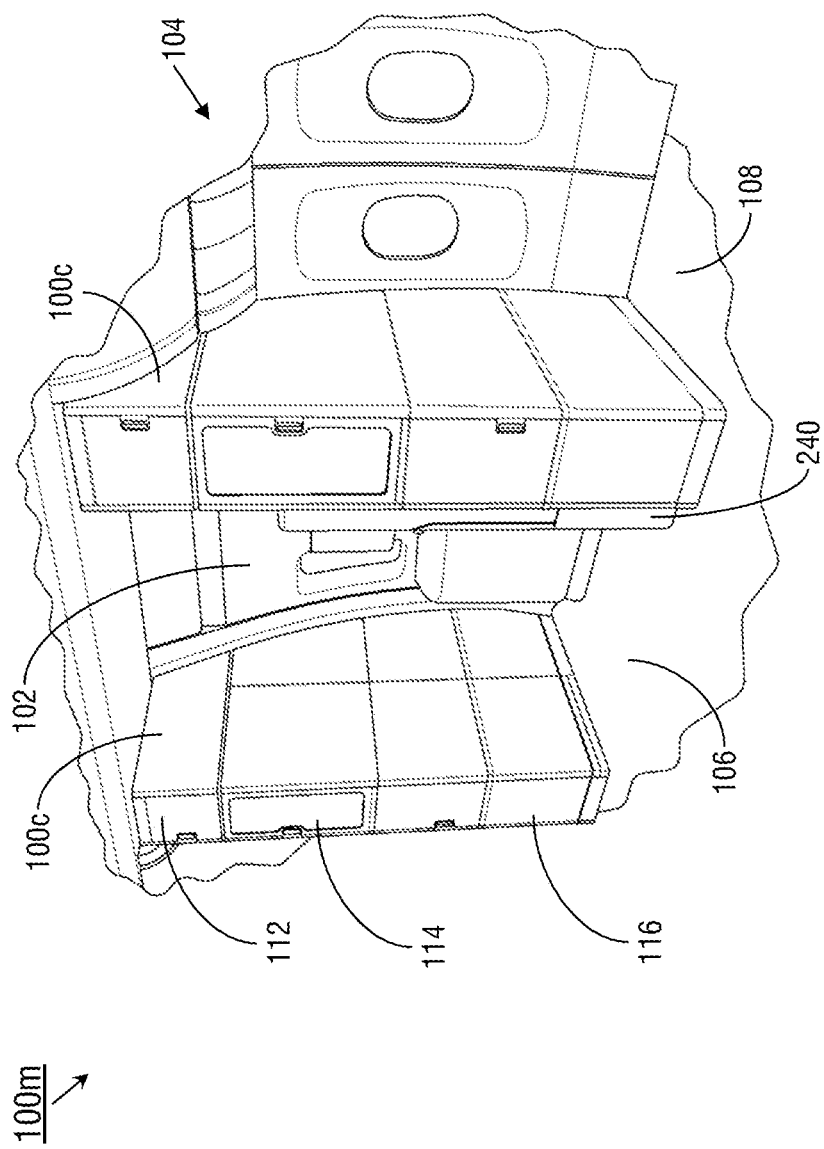
FIG. 15 is an isometric view of a transformable monument system according to embodiments of the inventive concepts disclosed herein.

Referring to FIG. 15, the transformable monument system 100m may be implemented and may function similarly to the transformable monument systems 100d-e of FIG. 2D, except that the transformable monument system 100m may incorporate left-side and right-side transformable monuments 100c on either side of the exit door 102, creating a temporary socialization or entertainment area within the cross-aisle 106 proximate to the exit door. In some embodiments, the transformable monument system 100m may incorporate (on either the left or the right side) any combination of the transformable monuments 100a-b (FIGS. 2C-D) as well as the left-side and right-side transformable monuments 100c on either side of the cross-aisle 106. Generally speaking, the transformable monument system 100m may be more commonly implemented in larger cross-aisles (106) associated with larger twin-aisle aircraft (104b, FIG. 2B). Both the left-side and right-side monuments 100c may separate the cross-aisle (106) from seating areas (108) of the aircraft 104 and may incorporate components of the transformable monuments 100a-b, 100f-j (FIGS. 3-6A), 100k-l (FIGS. 11-12). Generally the left-side and right-side transformable monuments 100c may be similar or identical with respect to the components of their upper portions 112, middle portions 114, and lower portions 116. Either the left-side or right-side transformable monument 100c may include an attendant seat 240 mounted to an inside panel; the attendant seat 240 may fold down for temporary use by cabin crew, e.g., during takeoff, climb, descent, and landing segments. The attendant seat 240 mounted to the right-side monument 100c may provide added structural stability to the right-side transformable monument when converted into the open configuration described below.

Figure 16:
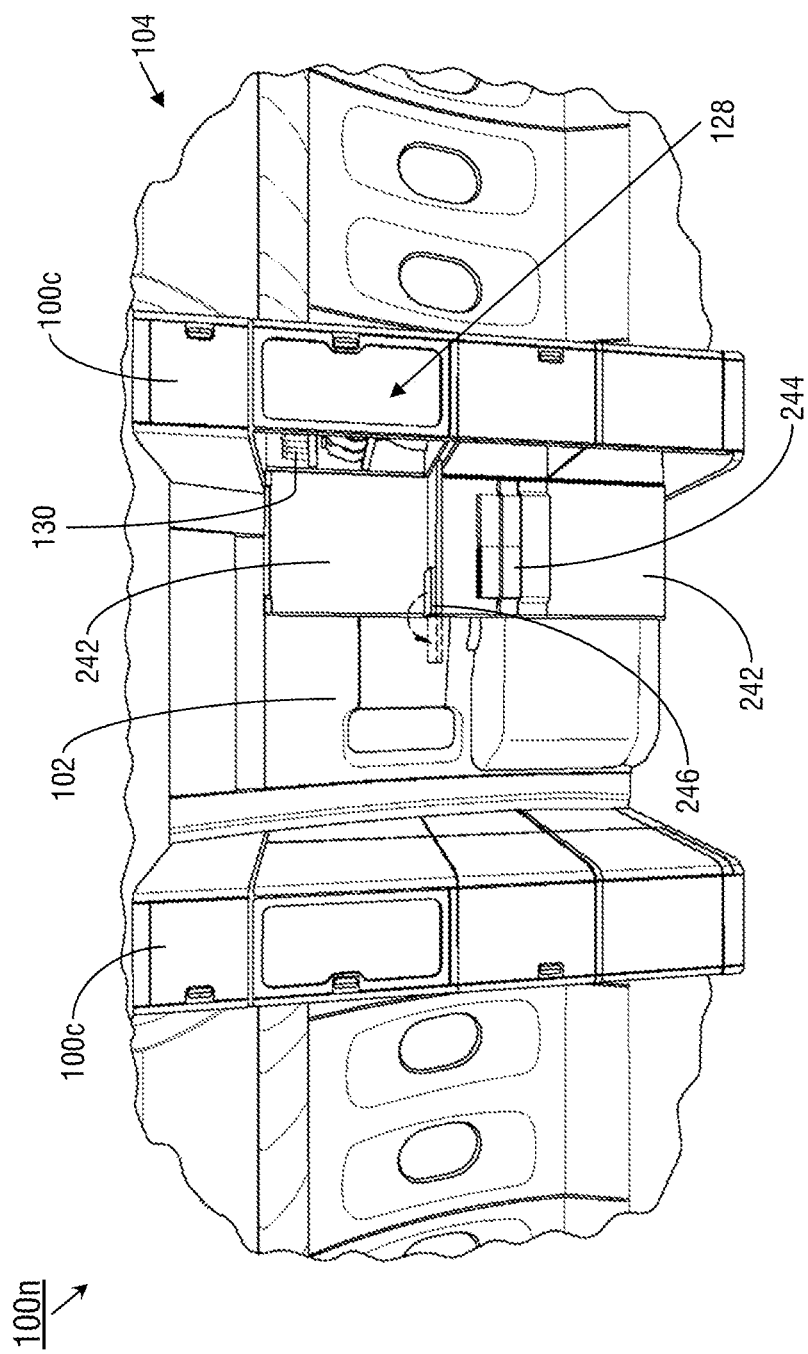
FIG. 16 illustrates the transformable monument system of FIG. 15 in a semi-open configuration.

Referring to FIG. 16, the transformable monument system 100n may be implemented and may function similarly to the transformable monument system 100m of FIG. 15, and the inside exterior panels 242 of the left-side and right-side transformable monuments 100c may be implemented and may function similarly to the pivoting portions 122a-b of FIG. 2D, except that the inside exterior panels 242 may pivot open to reveal literature compartments (244), self-service compartments (128) within which refreshments (130) may be stored for passenger selection, or fold-out ledges (246) for temporary placement of refreshments.

Figure 17A:
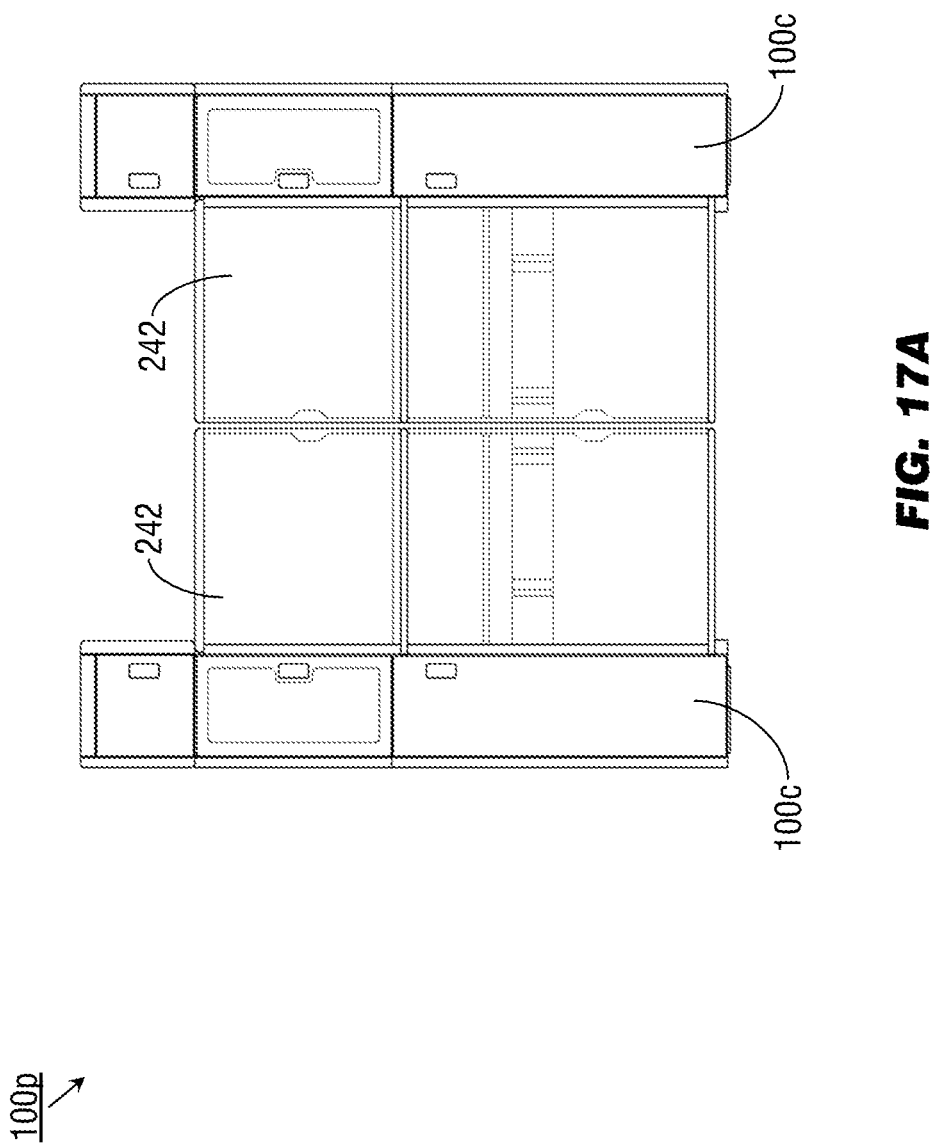
FIG. 17A is a forward view of the transformable monument system of FIG. 15 in a fully open configuration.

Referring to FIGS. 17A and 17B, the transformable monument system 100p may be implemented and may function similarly to the transformable monument system 100n of FIG. 16, except that the left-side and right-side monuments 100c of the transformable monument system 100p may fully extend their inside exterior panels 242 to create a temporary passenger destination space within the cross-aisle 106, obscuring the exit door 102. The left-side and right-side inside exterior panels 242 may not interconnect or physically link to each other when in the open configuration; rather, each inside exterior panel may pivot into its open configuration (e.g., through an angle of at least 90 degrees) and secure via locking ball detent latches (not shown) or other like means of independently weighing or loading each inside exterior panel for increased structural stability and resistance to vibration or rattling.

Referring in particular to FIG. 17B, the inside exterior panels 242 may each pivot open substantially 90 degrees inward (248) while translating in an outboard direction. Pivot arms (250) connect the outboard side of the exterior panels 242 to their respective transformable monuments 100c via fixed pivot points (250a-b) at either end of the pivot arms. For example, the right-side exterior panel 242 may pivot around the door pivot point 250a while the pivot arm 250 pivots around the fixed pivot point 250b relative to the right-side transformable monument 100c. The fold-out ledge 246 may include a base 246a and a leaf 246b that folds over from the base 312a when the inside exterior panels 308a-b have fully pivoted into their open configuration.

Figure 18A:
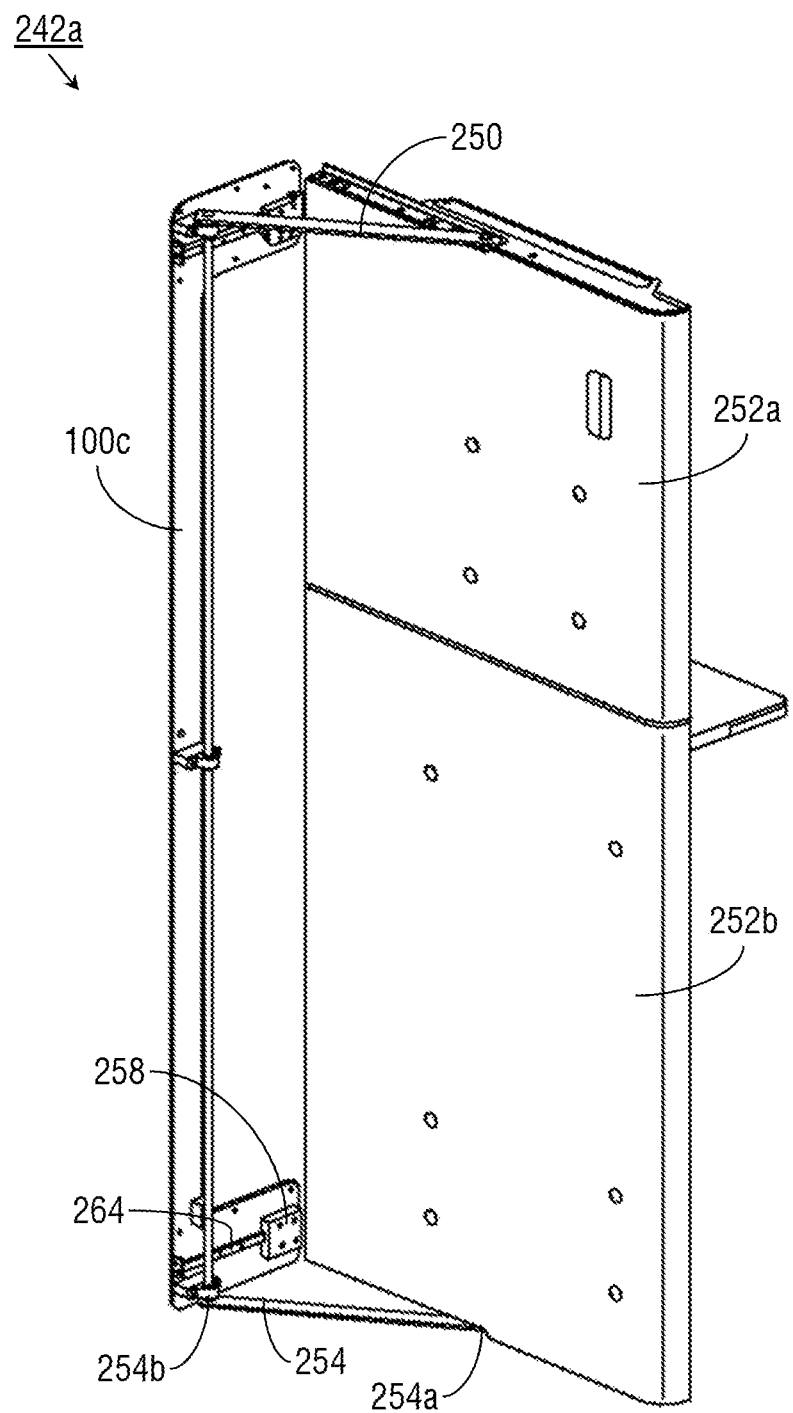
FIG. 18A illustrates an exterior panel of the transformable monument system of FIGS. 17A and 17B.
Figure 18B:
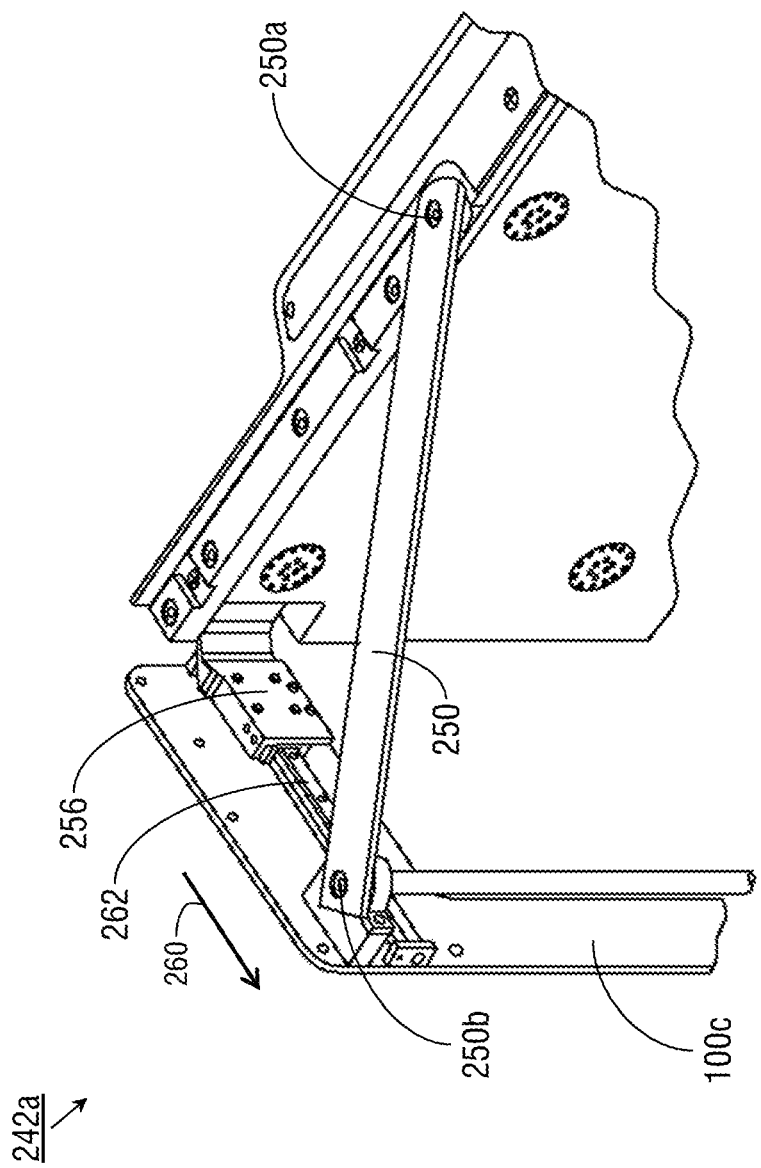
FIG. 18B is a detailed illustration of hinge and pivoting components of the exterior panel of FIG. 18A.

Referring to FIGS. 18A and 18B, the exterior panel 242a may be implemented and may function similarly to the left-side and right-side exterior panels 242 of FIGS. 17A-B, except that the exterior panel 242a may include upper and lower partitions 252a-b corresponding to the middle and lower portions 114, 116 (FIG. 15) of the corresponding right-side transformable monument 100c. The exterior panel 242a may be mounted to the right-side transformable monument 100c by an upper pivot arm 250 and a lower pivot arm 254, both pivot arms extending from fixed pivot points 250b, 254b to door pivot points 250a, 254a. The exterior panel 242a may further be connected to the right-side transformable monument 100c by an upper hinge 256 and a lower hinge 258, the upper and lower hinges operating in concert with the pivot arms 250, 254 as the exterior panel 242a pivots into the open configuration (as shown by FIGS. 17A-B).

Referring in particular to FIG. 18B, as the exterior panel 242a pivots into the open configuration, the upper and lower hinges 256, 258 translate outboard (260) with the exterior panel along upper and lower hinge slides 262, 264. When the exterior panel 242a is converted back into the closed, default configuration (as shown by FIG. 15), the upper and lower hinges 256, 258 translate inboard along the hinge slides 262, 264 with the exterior panel.

Figure 19:
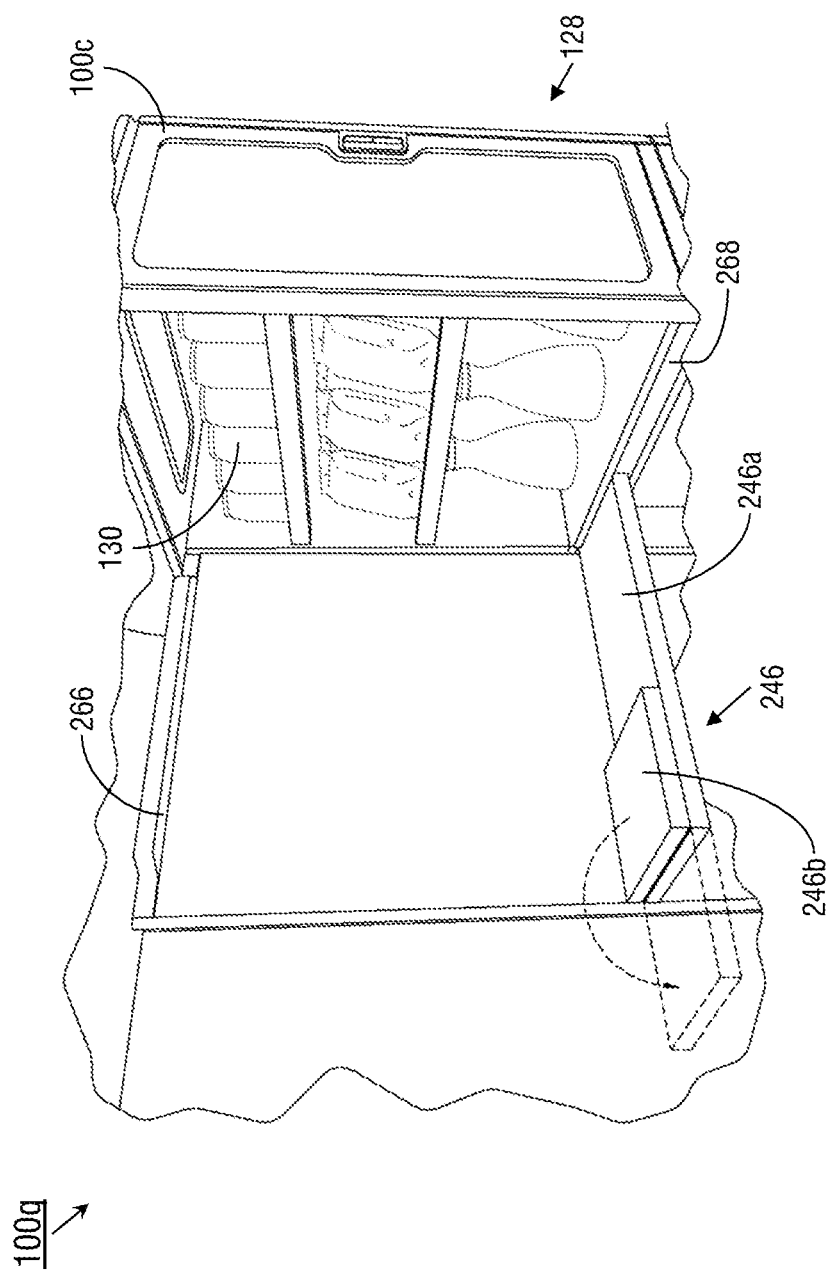
FIG. 19 illustrates components of a self-serving compartment of the transformable monument system of FIG. 15.

Referring to FIG. 19, the transformable monument system 100q may be implemented and may function similarly to the transformable monument system 100p of FIGS. 17A-B, except that the transformable monument system 100q may include auxiliary lighting elements (266) and fold-out shelves (246) for temporary placement of beverages or other refreshments (130), e.g., available in a self-service compartment 128 of the transformable monument system 100q. The fold-out shelves 246 may be partially or fully stored within a slot (268) within the transformable monument 100c while the transformable monument system 100q is in the default, closed configuration (as shown by FIG. 15). The fold-out shelf 246 may include a base portion 246a and a leaf portion 246b; when the transformable monument system 100q is in the open configuration, the leaf portion 246b may be folded over from the base portion 246a to fully extend the fold-out shelf 246. The auxiliary lighting elements 266 may be connected to an aircraft network controller for central control of the activation, deactivation, or dimming of the lighting elements, or the auxiliary lighting elements may be activated by the conversion of the transformable monument system 100q to the open configuration (e.g., similarly to the interior lighting (182, FIG. 10) of the self-service compartment 128).

Figure 20:
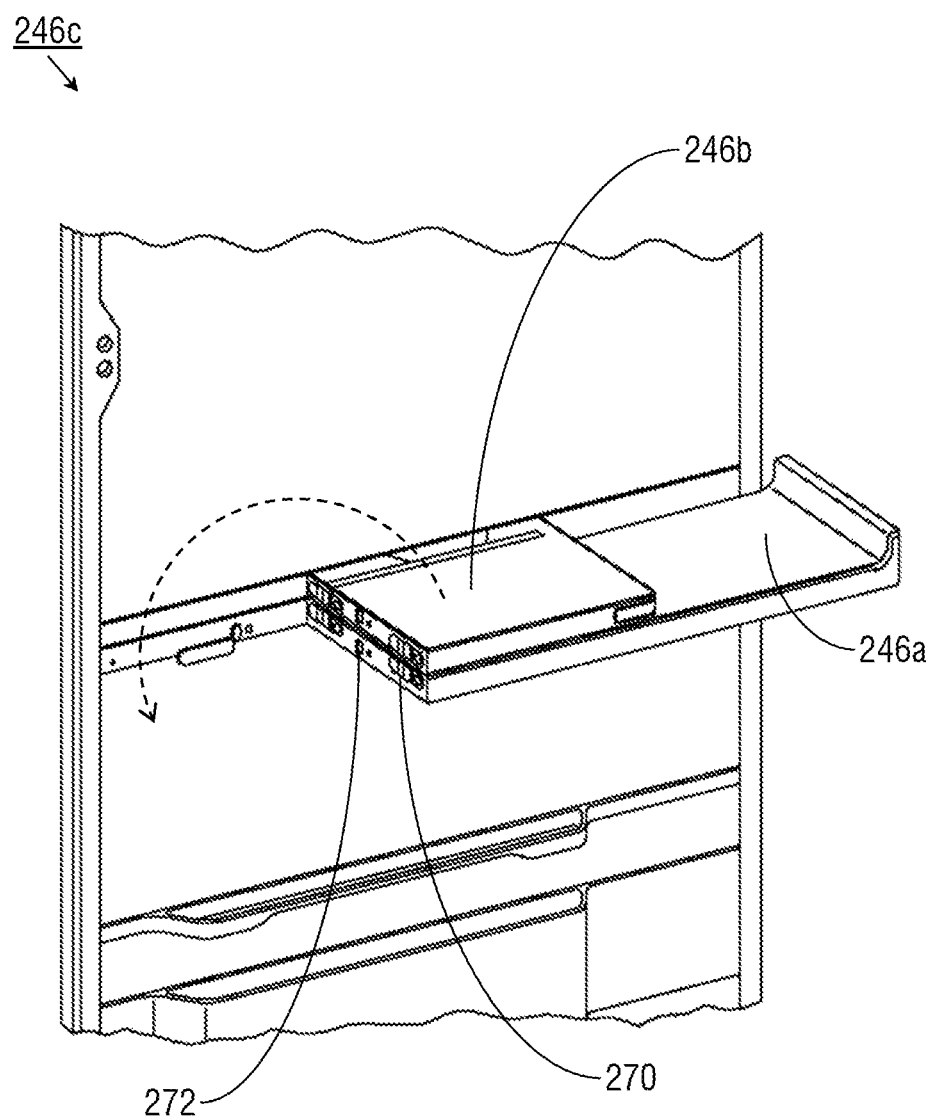
FIG. 20 illustrates components of the foldout shelf of FIG. 19.

Referring to FIG. 20, the fold-out shelf 246c may be implemented and may function similarly to the fold-out shelf 246 of FIG. 19, except that the fold-out shelf 246c may include power cabling for the auxiliary lighting elements (266, FIG. 19) within the base section 246a and leaf section 246b. For example, the base section 246a and leaf section 246b may be connected by invisible hinges (270) that disappear from view as the leaf section 246b is folded over to fully extend the foldout shelf 246c. The base section 246a and leaf section 246b may additionally conceal a Reed switch (272) or like magnetic switching means connected to the power cabling, such that when the leaf section 246b is folded over, the switch circuit completes and the auxiliary lighting elements 266 are activated (and again deactivated when the leaf section is folded back onto the base section).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A multimode transformable monument system, comprising:
    at least a first monument and a second monument positionable between a floor and a ceiling of an aircraft and on either side of a lateral aisle adjacent to an exit door of the aircraft,
    the first monument and the second monument each having an inward side adjacent to the lateral aisle and an outward side opposite the inward side,
    the first monument and the second monument each comprising one or more exterior panels configured to define a passenger socialization space when in a deployed state by reversibly pivoting from the inward side relative to a substantially vertical rotational axis from a stowed state to the deployed state, the exterior panels in the deployed state adjacent to each other and including at least one of a ledge or a compartment comprising one or more items accessible to a passenger, the exterior panels in the deployed state configured to fully obstruct the exit door.

2. The multimode transformable monument system of claim 1, wherein the one or more exterior panels include:
    at least one first storage compartment accessible from the passenger socialization space when the associated exterior panel is in the deployed state.

3. The multimode transformable monument system of claim 1, further comprising:
    at least one deployable seat attached to the inward side of at least one of the first monument or the second monument, the deployable seat capable of accommodating a crewmember when the one or more exterior panels are in the stowed state.

4. The multimode transformable monument system of claim 1, further comprising:
    at least one second storage compartment disposed within either the first monument or the second monument and accessible from the passenger socialization space when at least one of the one or more exterior panels is in the deployed state.

5. The multimode transformable monument system of claim 4, wherein the second storage compartment is accessible via at least one door, further comprising:
    at least one inventory sensor disposed within the second storage compartment, the inventory sensor configured to detect a removal of an item stored within the second storage compartment.

6. The multimode transformable monument system of claim 5, wherein the inventory sensor includes a camera communicatively coupled to a network of the aircraft, the camera configured to:
    capture at least one image corresponding to the removal; and
    forward the captured image to the network.

7. The multimode transformable monument system of claim 1, further comprising:
    at least one edge lighting element communicatively coupled to a network of the aircraft, the edge lighting element capable of generating luminous output and configured to at least one of activate, deactivate, or adjust the luminous output based on one or more of a time, a flight segment, or command input provided to the network by a crewmember.

8. The multimode transformable monument system of claim 1, wherein the one or more exterior panels include at least one locking latch configured to secure the associated exterior panel in the deployed state.

* * * * *